US012649100B2

(12) United States Patent
    Follmann et al.

(10) Patent No.: US 12,649,100 B2
(45) Date of Patent: Jun. 9, 2026

(54) BLUETOOTH STEREO SPEAKER HOVERBOARD WITH VOICE CONTROL

(71) Applicant: GOLABS Inc., Carrollton, TX (US)

(72) Inventors: Ryan Matthew Follmann, Fitchburg, WI (US); Eric Charles Masters, Mount Horeb, WI (US)

(73) Assignee: GOLABS INC., Carrollton, TX (US)

( * ) Notice: Subject to any disclaimer, the term of this patent is extended or adjusted under 35 U.S.C. 154(b) by 368 days.

(21) Appl. No.: 18/515,138

(22) Filed: Nov. 20, 2023

(65) Prior Publication Data

US 2024/0390773 A1    Nov. 28, 2024

Related U.S. Application Data

(60) Provisional application No. 63/468,609, filed on May 24, 2023.

(51) Int. Cl.
    *A63C 17/26*        (2006.01)
    *A63C 17/00*        (2006.01)
    (Continued)

(52) U.S. Cl.
    CPC .......... *A63C 17/26* (2013.01); *A63C 17/0006* (2013.01); *A63C 17/12* (2013.01); *F21V 33/008* (2013.01); *G06F 3/165* (2013.01); *H04R 1/025* (2013.01); *H04R 5/02* (2013.01); *H04R 5/04* (2013.01); *F21Y 2115/10* (2016.08); *H04R 2420/07* (2013.01); *H04R 2499/13* (2013.01)

(58) Field of Classification Search
    CPC ..... A63C 17/26; A63C 17/0006; A63C 17/12; A63C 2203/12; A63C 2203/22; A63C 2203/24; A63C 2203/42; F21V 33/008; G06F 3/165; H04R 1/025; H04R 5/02; H04R 5/04; H04R 2420/07; H04R 2499/13; H04R 1/028; F21Y 2115/10
    See application file for complete search history.

(56) References Cited

U.S. PATENT DOCUMENTS 9,376,155 B2 * 6/2016 Ying ..................... B62D 51/02
9,604,692 B1 * 3/2017 Kim ..................... B62D 51/001
    (Continued)

FOREIGN PATENT DOCUMENTS

CN          105129005 A  * 12/2015
CN          205906129 U  * 1/2017  .............. B60L 15/28
WO    WO-2024063749 A1 * 3/2024  .............. B62K 1/00

*Primary Examiner* — Drew J Brown
(74) *Attorney, Agent, or Firm* — AP3 Law Firm PLLC

(57)        ABSTRACT

A hoverboard includes: a main body including a left main body and a right main body, where the left main body and the right main body are independently tiltable around a center axis of the main body; a left wheel and a right wheel attached to the left main body and the right main body, respectively; a first fender and a second fender attached to a top surface of the main body proximate to the left wheel and the right wheel, respectively; a carrying handle attached to a front side of the main body; at least two speakers at a bottom surface of the main body; a wireless communication circuit configured to be paired with a user device for streaming digital media; and a stereo control panel at the bottom surface of the main body and having a suite of buttons for controlling playback of the digital media.

20 Claims, 19 Drawing Sheets

(51) Int. Cl.

| | |
|---|---|
| *A63C 17/12* | (2006.01) |
| *F21V 33/00* | (2006.01) |
| *F21Y 115/10* | (2016.01) |
| *G06F 3/16* | (2006.01) |
| *H04R 1/02* | (2006.01) |
| *H04R 5/02* | (2006.01) |
| *H04R 5/04* | (2006.01) |

(56) References Cited

U.S. PATENT DOCUMENTS

| | | | | |
|---|---|---|---|---|
| D808,855 | S | * | 1/2018 | Zhang .............................. D12/1 |
| 10,252,724 | B2 | * | 4/2019 | Edney .................. B62K 11/007 |
| 10,736,799 | B1 | * | 8/2020 | Dickie .................. A61G 5/047 |
| D897,236 | S | * | 9/2020 | Xu .................................. D12/1 |
| D910,791 | S | * | 2/2021 | Xu .............................. D21/760 |
| D926,902 | S | * | 8/2021 | Ke .............................. D21/763 |
| 11,103,394 | B1 | * | 8/2021 | Dickie ................ A61G 5/1089 |
| D960,995 | S | * | 8/2022 | Zhang ......................... D21/423 |
| D1,061,770 | S | * | 2/2025 | Shi .............................. D21/763 |
| 12,227,103 | B1 | * | 2/2025 | Lerner ................... B60L 58/12 |
| D1,065,399 | S | * | 3/2025 | Follmann ..................... D21/763 |
| D1,067,351 | S | * | 3/2025 | Shi .............................. D21/763 |
| 2017/0203811 | A1 | * | 7/2017 | Germanovsky ........ A61G 5/125 |
| 2018/0286236 | A1 | * | 10/2018 | Mazzola .......... G08G 1/096838 |

* cited by examiner

BLUETOOTH STEREO SPEAKER HOVERBOARD WITH VOICE CONTROL

RELATED APPLICATION

This application claims the priority of U.S. Provisional Application No. 63/468,609, filed on May 24, 2023 and entitled "Bluetooth Stereo Speaker Hoverboard with Voice Control," which application is hereby incorporated by reference in its entirety.

BACKGROUND

Hoverboards have become a popular form of personal transportation, particularly among young people. Hoverboards may be used for traveling short distances in urban areas, or for entertainment with friends and family. Some hoverboards come equipped with features such as Bluetooth speakers, light-emitting diode (LED) lights, or mobile applications (apps) connectivity for added convenience and entertainment. However, the speakers of the existing hoverboard only provide basic sound quality. The mobile apps of the existing hoverboard may have limited functionalities. The LEDs of existing hoverboards are used only for illumination purpose.

The existing hoverboards have limited use as an e-mobility device and limited use for entertainment. New hoverboard designs with improved sound quality, functionality, longer range, and improved entertainment value are needed.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF ILLUSTRATIVE EXAMPLES

Figure 1:
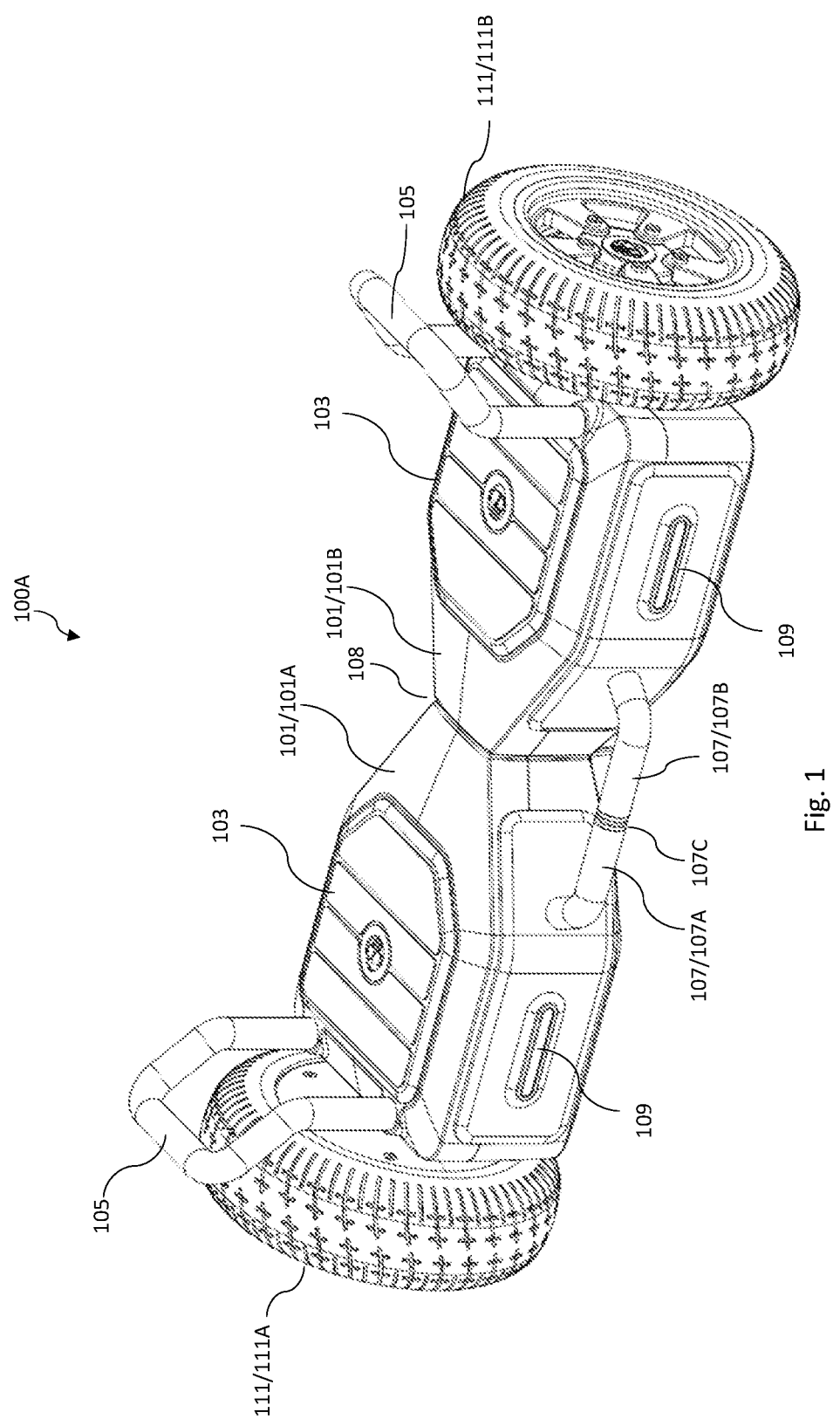
FIGS. 1-8 illustrate different views of a hoverboard, in an embodiment.
Figure 2:
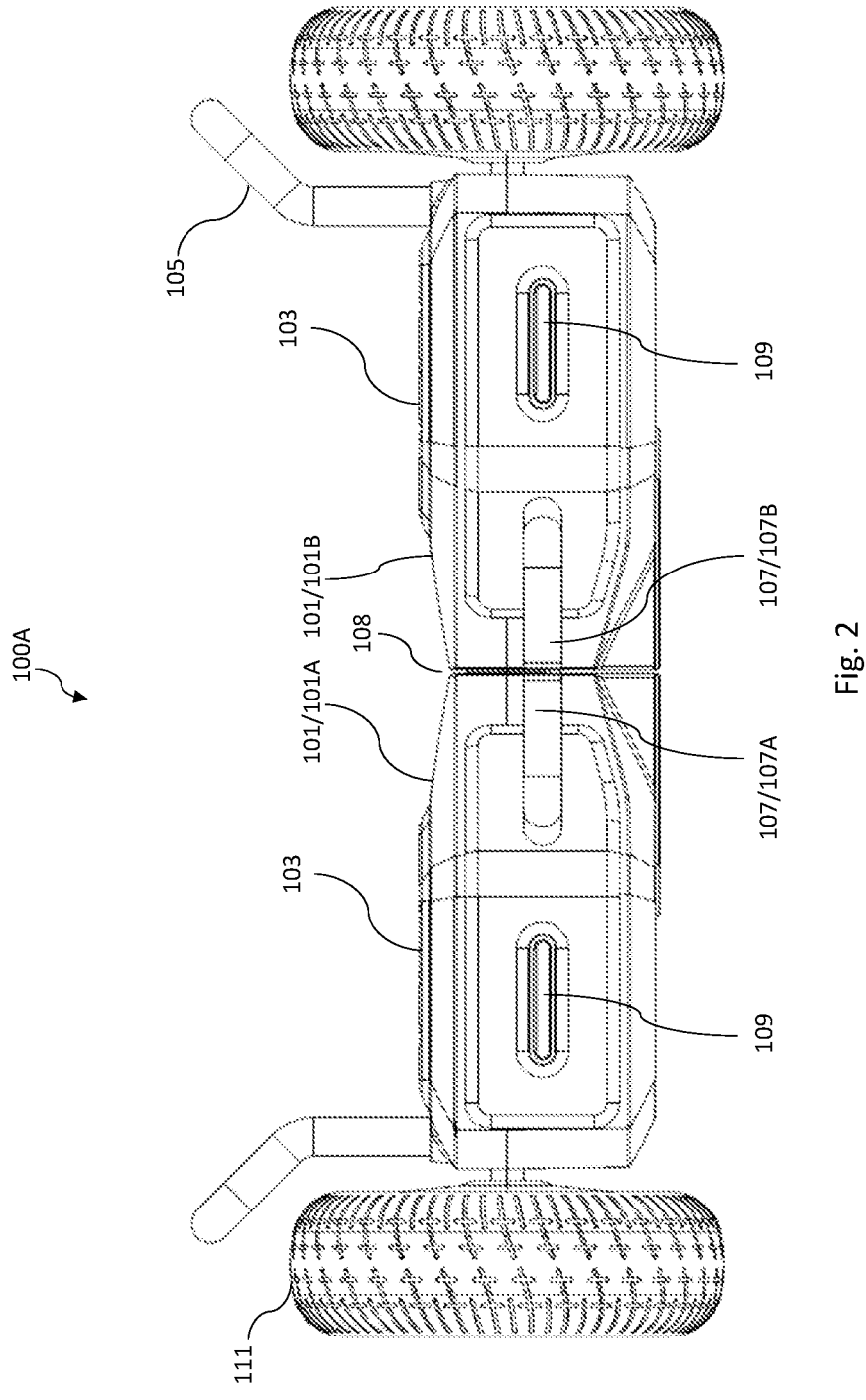

The making and using of the presently disclosed examples are discussed in detail below. It should be appreciated, however, that the present invention provides many applicable inventive concepts that can be embodied in a wide variety of specific contexts. The specific examples discussed are merely illustrative of specific ways to make and use the invention, and do not limit the scope of the invention. Throughout the discussion herein, unless otherwise specified, the same or similar reference numerals or labels in different figures refer to the same or similar component.

Figure 7:
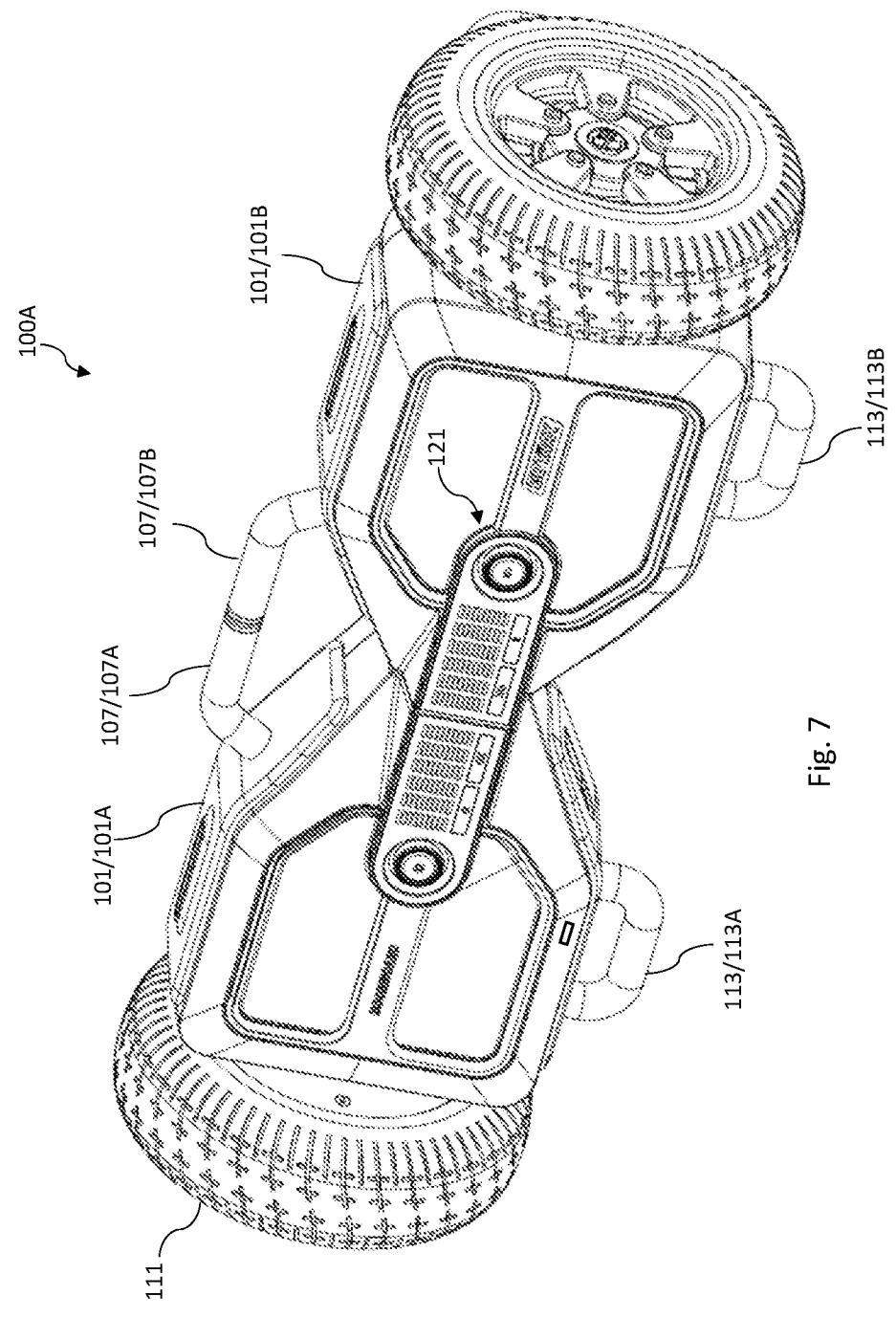
Figure 8:
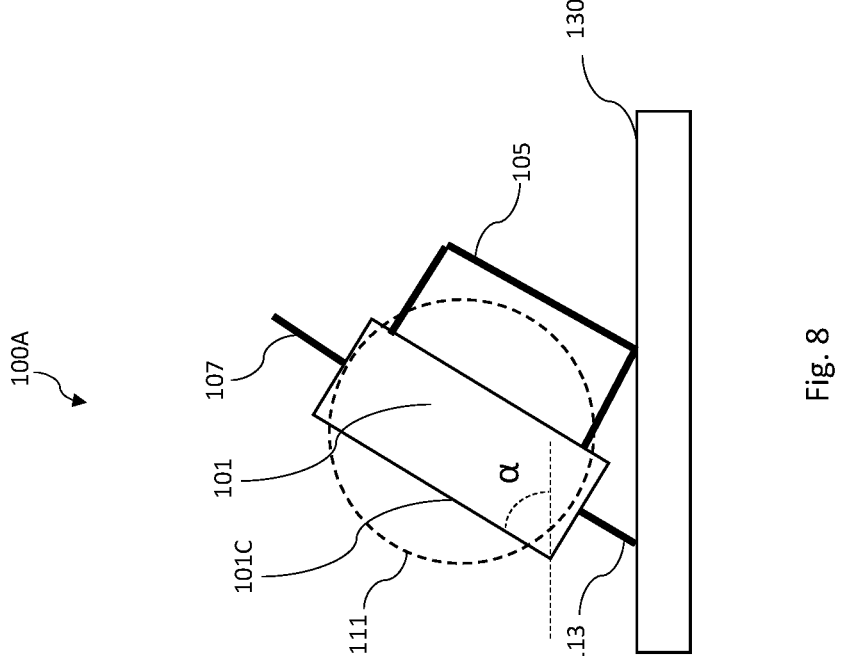

FIGS. 1-8 illustrate different views (e.g., perspective view, top view, front view, back view, or side view) of a hoverboard 100A, in an embodiment. In particular, FIGS. 1 and 7 each illustrates a perspective view of the hoverboard 100A. FIGS. 2, 3, 4, 5, and 6 illustrate a front view, a back view, a top view, a bottom view, and a side view of the hoverboard 100A, respectively. FIG. 8 illustrates a side view of the hoverboard 100A when the hoverboard is placed on a flat surface 130.

The hoverboard 100A operates in two different modes: a riding mode and a stereo mode. In the riding mode, the hoverboard 100A functions as a hoverboard for transporting a rider. In the stereo mode, the hoverboard 100A functions as a stereo system with premium sound qualify and a suite of buttons for controlling the playback of music. Details are discussed hereinafter. In the discussion herein, the hoverboard 100A (or 100B) in stereo mode may also be referred to as a stereo system.

As illustrated in FIGS. 1-7, the hoverboard 100A has a main body 101, which includes a left main body 101B and a right main body 101A. The left main body 101B and the right main body 101A are be formed of a suitable material(s), such as plastics or the like. Pressure pads 103 (may also be referred to as foot pads) are formed on the top surface of the main body 101. Pressure pads 103 may be formed of, e.g., a rubber material or other suitable material(s). Pressure sensors (not separately illustrated) may be formed in, or under, the pressure pads 103 to sense whether a user (e.g., a person who rides on the hoverboard, also referred to as a rider) is standing on the pressure pads 103. In some embodiments, besides pressure sensors, infrared (IR) sensors are embedded in or around the pressure pads 103. The IR sensors and the pressure sensors may be used to detect the rider's position on the hoverboard 100A, and the processor (see 201 in FIG. 16) of the hoverboard 100A uses the outputs of the IR sensors and the pressure sensors, along with outputs from other sensors, to determine how to drive the wheels 111 of the hoverboard 100A to maintain balance for the rider.

The left main body 101B and the right main body 101A are attached to a center axis 102 (see label in FIG. 4) of the main body 101, and are tiltable around the center axis 102 independently. In other words, each of the left main body 101B and the right main body 101A can rotate around the center axis 102 independently within a certain range of angles. Note that in FIG. 4, only a portion of the center axis 102 is shown in a gap 108 between the left main body 101B and the right main body 101A. The center axis 102 extends along the horizontal direction of FIG. 4. The rider may control the direction of travel for the hoverboard 100A by tilting the left main body 101B and/or the right main body 101A. The center axis 102 may be formed of a suitable material(s), such as steel, an alloy, or the like. Each of the left main body 101B and the right main body 101A also has a gyroscope for sensing the position of the hoverboard 100A.

Wheels 111 (e.g., a left wheel 111B and a right wheel 111A) are attached to a left side of the main body 101 and a right side of the main body 101. Each of the wheels 111 is driven by a motor (e.g., a brushless motor), which motor may be embedded in or integrated with the wheel 111. Each of the wheels 111 also has a tilt and speed sensor built in or attached, which measures the rotational speed of the wheel 111, and may provide additional information such as the titling angle of the left main body 101B or the right main body 101A. In some embodiments, the gyroscope is integrated as part of the tile and speed sensor.

A fender 105 is attached to the top surface of the left main body 101B proximate to the left wheel 111B, and a fender 105 is attached to the top surface of the right main body 101A proximate to the right wheel 111A. In the example of FIGS. 1-7, the fenders 105, besides providing some protection for/separation from the wheels 111, may also function as handles for carrying the hoverboard 100A. The fenders 105 may be formed of, e.g., a metal material covered by a rubber material.

A carrying handle 107 is attached to the front side of the main body 101. In the example of FIGS. 1-7, the carrying handle 107 includes a left handle 107B attached to the front side of the left main body 101B, and includes a right handle 107A attached to the front side of the right main body 101A. A gap 107C exists between the left handle 107B and the right handle 107A. The gap 107C allows the handles 107B and 107A to move with the left main body 101B and the right main body 101A, respectively. The carrying handle 107 may also function as a front bumper of the hoverboard 100A. The carrying handle 107 may be formed of a same or similar material as the fenders 105.

Built-in stands 113 (also referred to as feet, see, e.g., FIG. 4) are attached to the backside of the main body 101. In particular, a first built-in stand 113B is attached to the backside of the left main body 101B, and a second built-in stand 113A is attached to the backside of the right main body 101A. The built-in stands 113 may be formed of a same or similar material as the fenders 105. As will be discussed hereinafter, when the hoverboard 100A is operating in a stereo mode, the built-in stands 113 and the fenders 105 form a stand to support (e.g. prop up) the main body 101, and the stand lifts the wheels 111 off a flat surface on which the hoverboard is placed. The built-in stands 113 may also function as rear bumpers of the hoverboard 100A. A shoulder strap (not illustrated) may be attached to the built-in stands 113 for transporting the hoverboard 100A, when the hoverboard 100A is not in use.

Light-emitting diodes (LEDs) are formed at various locations of the hoverboard 100A. For example, LEDs 109 may be formed at the front side of the main body 101. LEDs 109 may also be formed in the wheels 111 (see FIG. 6). Additionally, LEDs 124 may be formed on a bottom surface of the main body 101 (see FIG. 5). The LEDs 109/124 may be able to display different colors and/or may have different shapes, and may be programmed (e.g., controlled by the processor 201) to display fixed light patterns or modulated light patterns, e.g., light patterns that change with the beat of the music. Details are discussed hereinafter.

Figure 3:
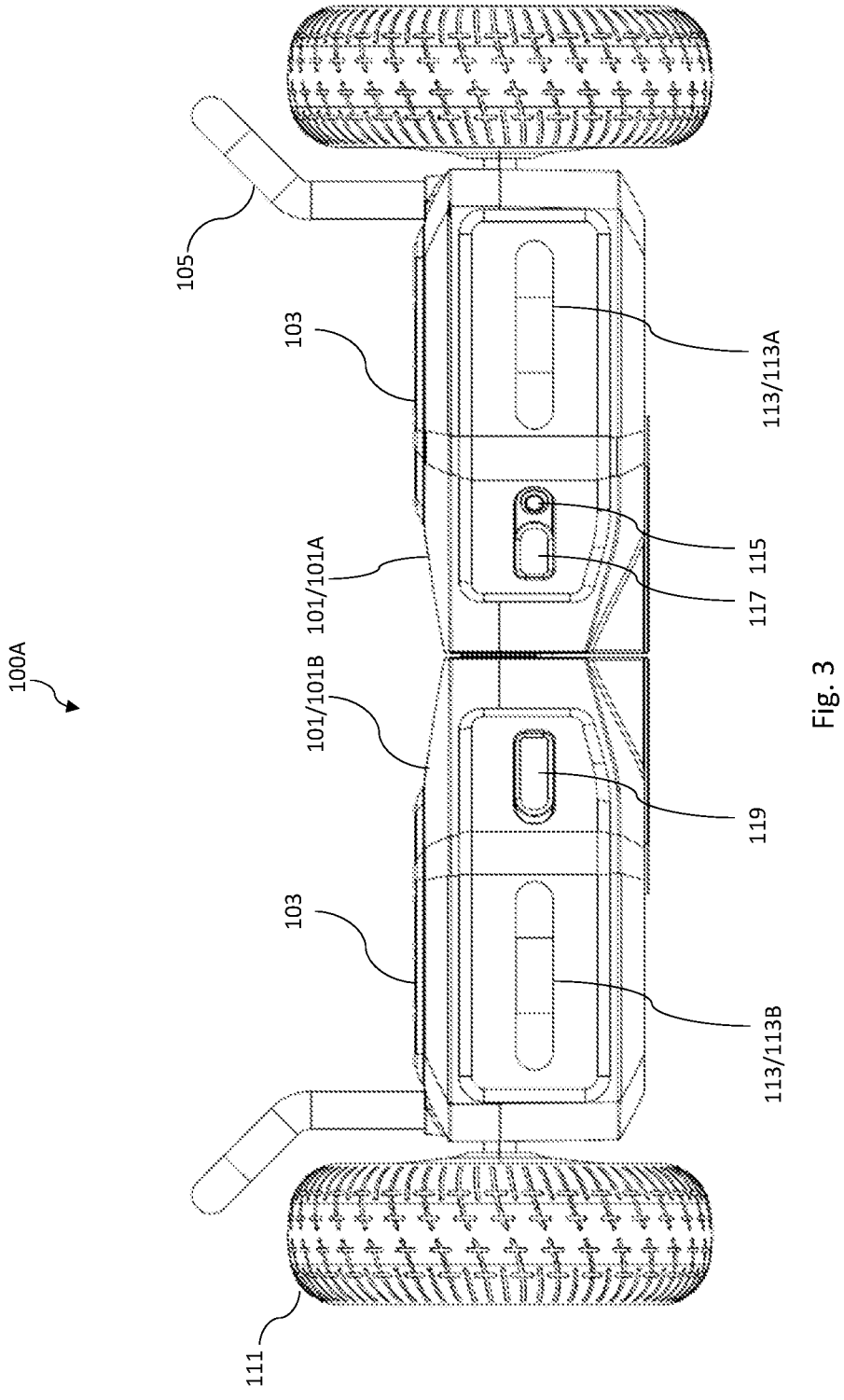
Figure 4:
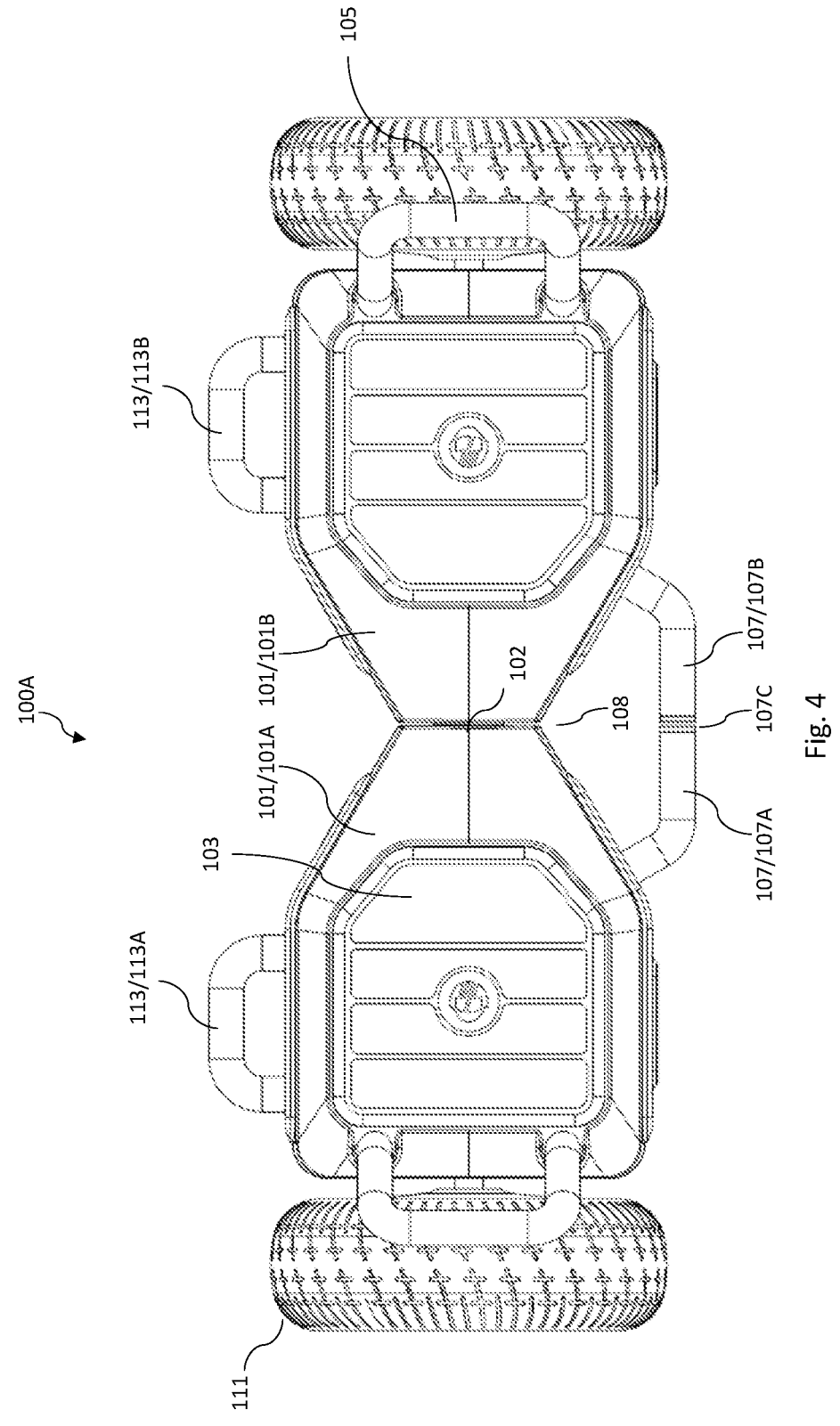

FIG. 3 illustrates peripheral ports 117 and 119 and switches 115 at the back side of the main body 101. The peripheral port 117 may provide a port (e.g., an electrical connection interface) for charging the battery (e.g., a rechargeable battery pack) of the hoverboard 100A. The peripheral port 119 may provide additional ports, such as USB ports for charging mobile devices connected to the hoverboard 100A. The peripheral port 119 may also provide data ports for maintenance (e.g., updating firmware of the hoverboard 100A) and/or diagnostics (e.g., for repair). The switches 115 may be used to turn on or off the hoverboard 100A, and may be used to select the mode of operation for the hoverboard 100A. The numbers and the locations of the peripheral ports 117/119 and the switches 115 illustrated in FIG. 3 are illustrative and non-limiting. Other numbers and other locations are also possible and are fully intended to be included within the scope of the present disclosure.

Figure 5:
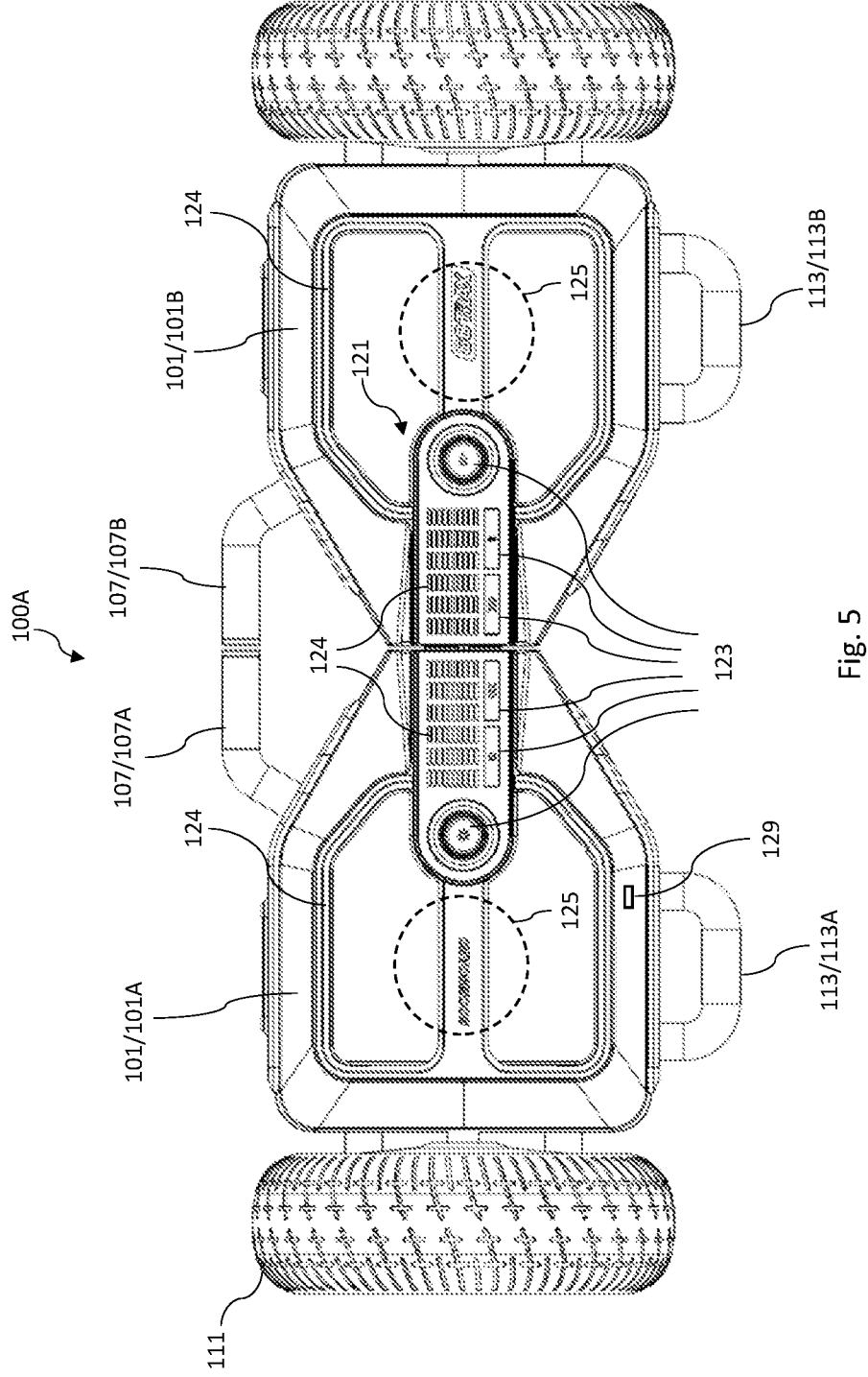
Figure 6:
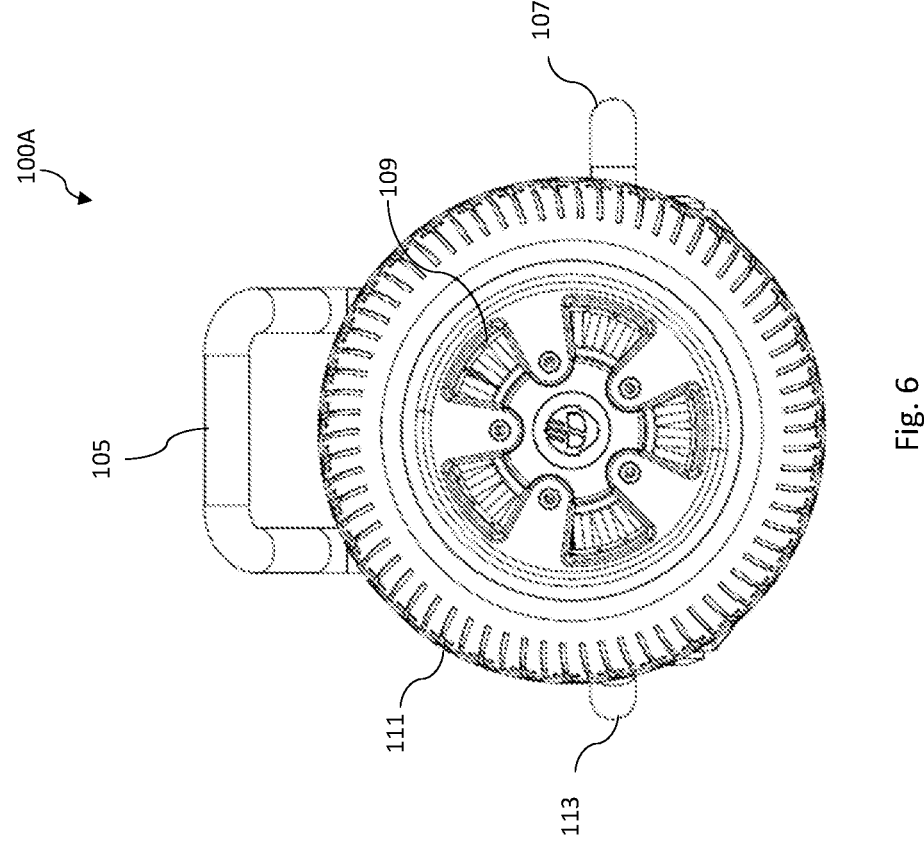

FIG. 5 illustrates the bottom surface of the main body 101. As illustrated in FIG. 5, a plurality of speakers 125 are at the bottom surface of the main body 101. The speakers 125 are illustrated in dashed lines in FIG. 5, because the speakers 125 may be located behind speaker grilles (not illustrated). The speakers 125 are premium sound quality speakers that support playback of stereo music or sound (e.g., a left sound channel and a right sound channel). In addition, the speakers 125 may include a subwoofer for playback of low-frequency sound, and may include additional speakers to achieve a rich or complex sound quality.

Notably, a plurality of buttons 123 are formed at the bottom surface of the main body 101. The plurality of buttons 123 form a fully suite of buttons to control various aspects of playback of the music. For example, the buttons 123 may include a Play button for starting playback, a Stop button for stopping playback, a FF button for fast-forwarding, a FB button for fast-backwarding, a Next Track button for skipping to the next track, a Previous Track button for skipping to the previous track, a Pause button for pausing, a Pair button for paring to a user device (e.g., a Bluetooth-enabled mobile device running a mobile application (app) that pairs with the hoverboard 100A), a Volume Up button, a Volume Down button, and a Power button for turning off the speakers 125 and the LEDs 124. Unlike previous hoverboards which may have a limited number of low-quality speakers and a limited number of buttons for controlling limited playback function of the stereo system, the presently disclosed hoverboards (e.g., 100A, 100B) integrate multiple premium sound quality speakers and a suite of physical buttons (instead of relying on soft buttons of a mobile app running on a paired mobile device) to fully control the playback of music or sound.

Still referring to FIG. 5, LEDs 124 are formed at the bottom surface of the main body 101. In some embodiments, the LEDs 124 are capable of changing colors. The LEDs 124 may be used to indicate the speakers' volume, the battery power level, the connection status (e.g., connection with the user device). The LEDs 124 may be used to accentuate the shapes/outlines of the speakers 125 and/or the main body 101. In the illustrated embodiment, during the stereo mode, the light pattern of the LEDs 124 is modulated with (e.g., modified by) the music (or sound) being played, such that the light pattern of the LEDs 124 changes with the music (e.g., changes with the beat of the music). For example, characteristics of the LEDs 124, such as the color, the brightness, and the time instants to turn on or off the LEDs, are modulated by the music using a light pattern modulator (see 313 in FIG. 17). Therefore, the LEDs 124 may be modulated by the music (or sound) to put on a light show while the user listens to the music (or sound). One or more of the switches 115 may be used to select the modulation scheme (e.g., how the light pattern is modulated by the music). In previous hoverboards, the LEDs on the hoverboard may have a fixed light pattern (e.g., pre-determined light pattern) that does not depend on the music being played. The presently disclosed hoverboard (e.g., 100A and 100B) modulate the light pattern of the LEDs 124 with the music, thereby providing a more engaging and entertaining experience for the user. The LEDs 109 at the front side of the main body 101 is turned off during the stereo mode, and are configured to display a fixed light pattern (e.g., pre-determined light pattern) during the riding mode, in some embodiments.

FIG. 5 further illustrates a microphone 129 at the bottom surface of the main body 101. The microphone 129 is used for receiving voice command from the user to make hands-free phone calls or use voice assistants like Siri, Alexa, or Google Assistant through the paired user device. The number of microphones and the location of the microphones illustrated in FIG. 5 are illustrative and non-limiting. The buttons 123, the LEDs 124, and the microphone 120 may be collectively referred to as the control panel 121 of the stereo system.

FIG. 1 illustrates the position of the hoverboard 100A in the riding mode, where the bottom surface of the main body 101 faces the ground, and the top surface of the main body 101 faces upward and away from the ground. When the hoverboard is in the riding mode, the user may stand on the pressure pads 103 to steer the hoverboard 100A. FIG. 7 is a perspective view showing the position of the hoverboard 100A in the stereo mode, and FIG. 8 is a sideview showing the position of the hoverboard 100A in the stereo mode. Note that in FIG. 8, the wheel 111 is shown in dashed lines in order not to block the main body 101 and other components of the hoverboard 100A. Additionally, FIG. 8 shows a flat surface 130 on which the hoverboard 100A is placed. The flat surface 130 may be, e.g., an upper surface of a table or a bookshelf where the hoverboard 100A is place when the hoverboard is used as a fully functioning stereo system.

As shown in FIGS. 7 and 8, when the hoverboard is in the stereo mode, the bottom surface 101C of the main body 101 faces away from the ground and forms an acute angle α with the horizontal direction of FIG. 8. Notably, the built-in stands 113 and the fender 105 are in contact with the flat surface 130 and form a stable stand that elevates (e.g. props up) the main body 101 and the wheels 111 off from the flat surface 130. In other words, in the stereo mode, the hoverboard 100A is placed securely on the flat surface 130 of, e.g., a bookshelf, and the wheels 111 (and the main body 101) are not in contact with the flat surface 130, thus avoiding dirt and/or scratches on the flat surface 130. The control panel 121 at the bottom surface 101C faces the user for easy access. The user can use the buttons of the control panel 121 to operate the stereo system, and enjoy the light show performed by the LEDs 124.

FIGS. 9-15 illustrate different views (e.g., perspective view, top view, front view, back view, or side view) of a hoverboard 100B, in another embodiment. In particular, FIGS. 9 and 15 each illustrates a perspective view of the hoverboard 100B. FIGS. 10, 11, 12, 13, and 14 illustrate a front view, a back view, a top view, a bottom view, and a side view of the hoverboard 100B, respectively. The hoverboard 100B is similar to the hoverboard 100A, with the same or similar reference numeral referring to the same or similar component. Discussion below focuses on the differences between the hoverboard 100A and 100B.

Figure 9:
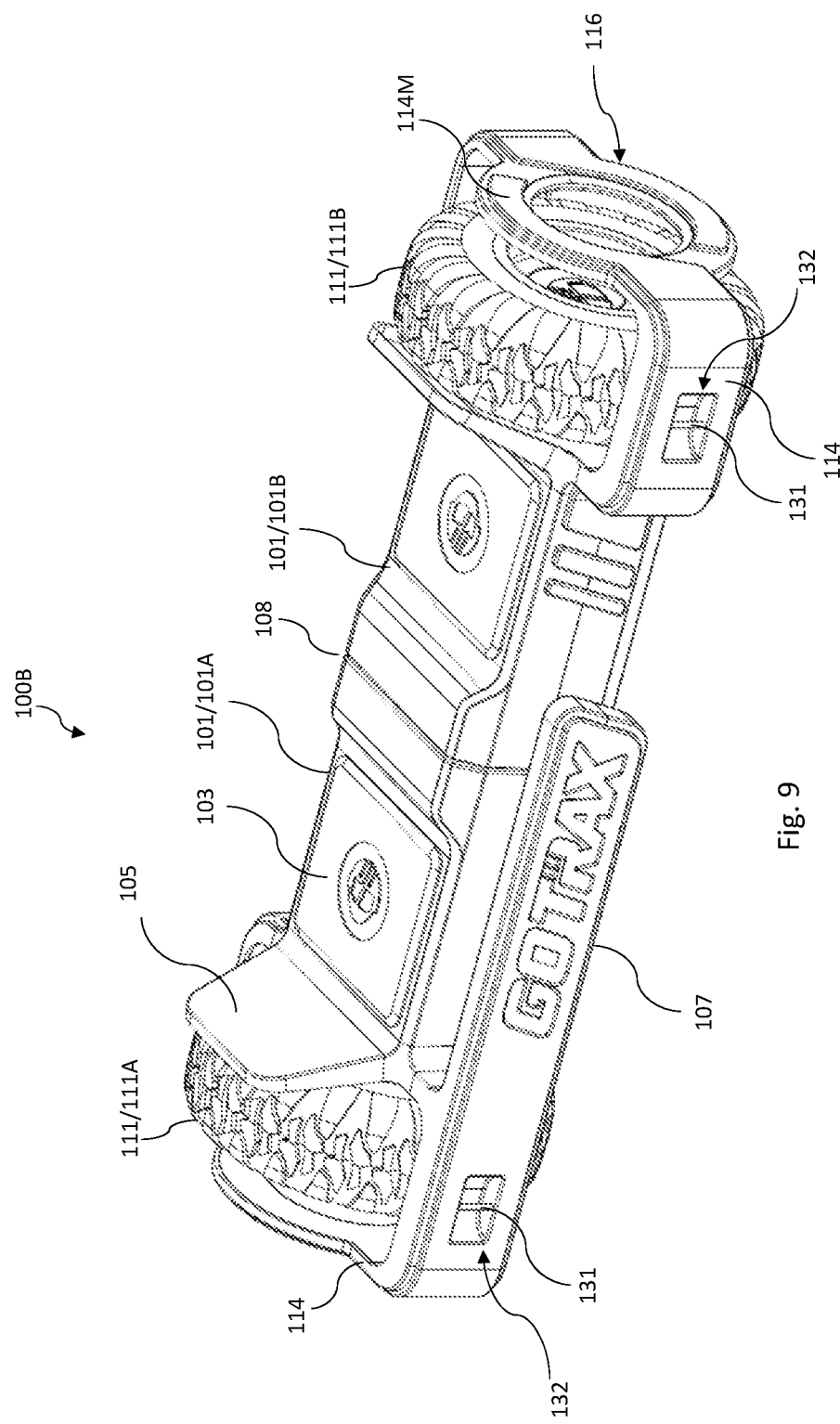
FIGS. 9-15 illustrate different views of a hoverboard, in another embodiment.
Figure 10:
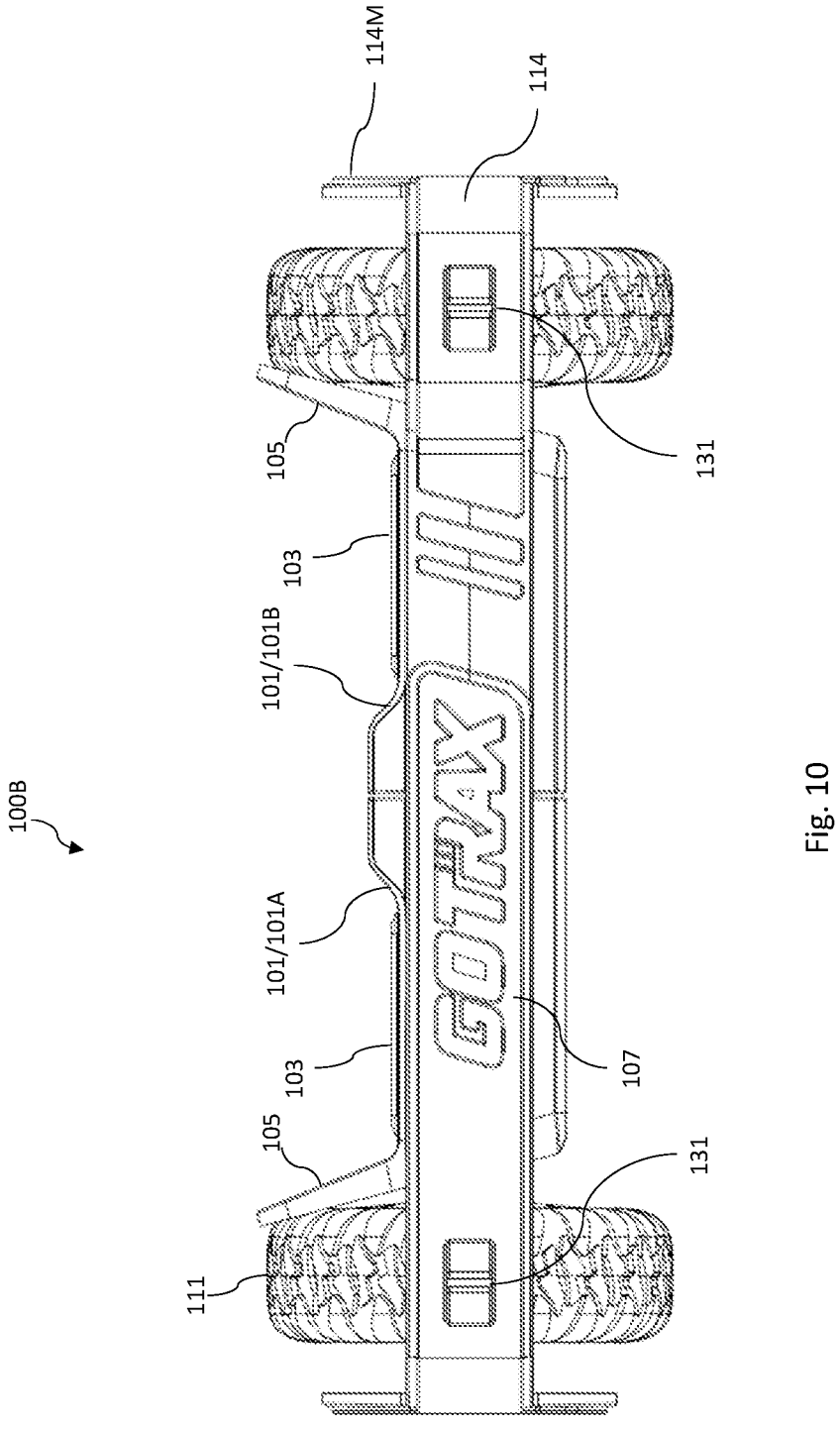
Figure 11:
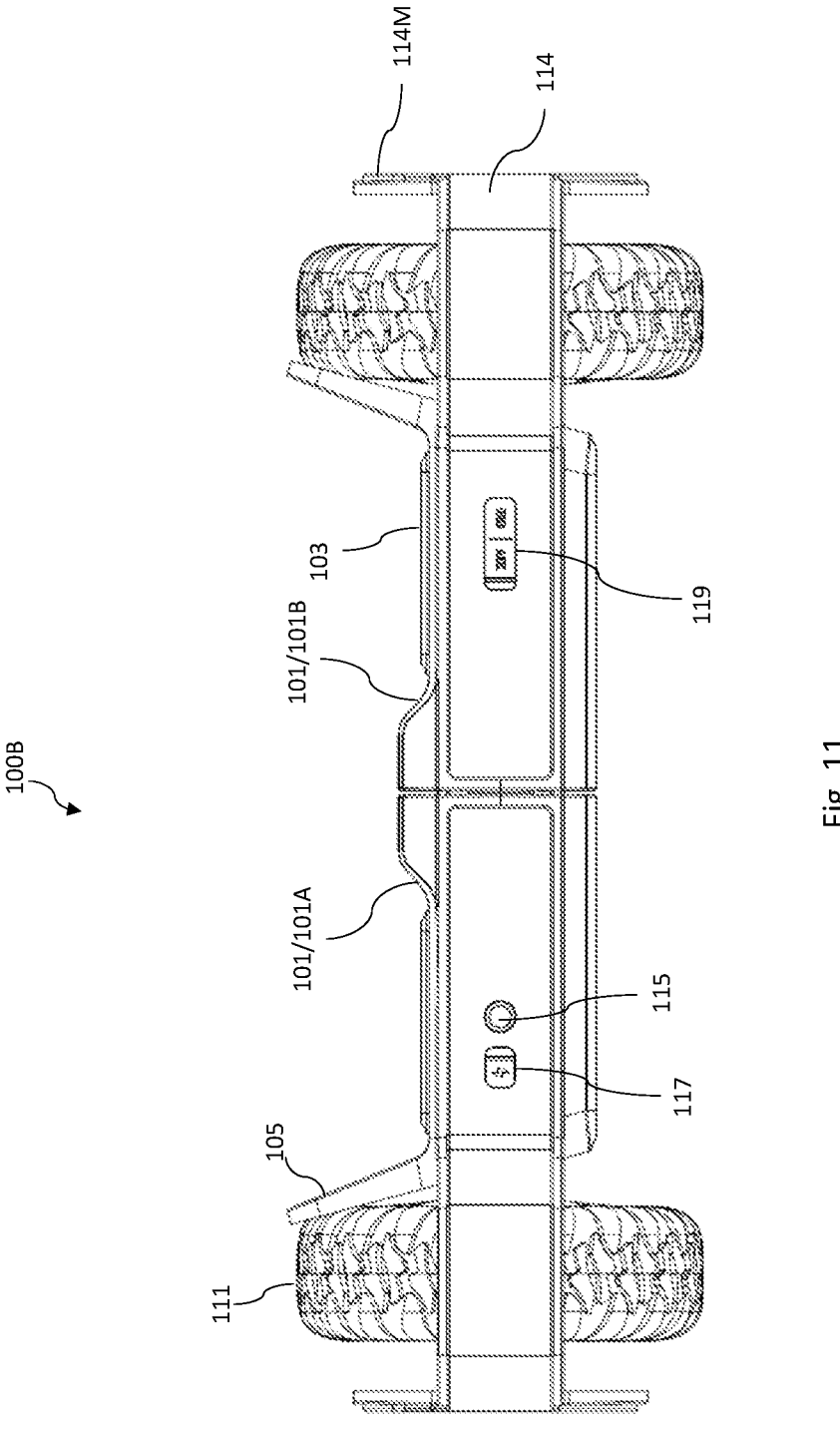
Figure 12:
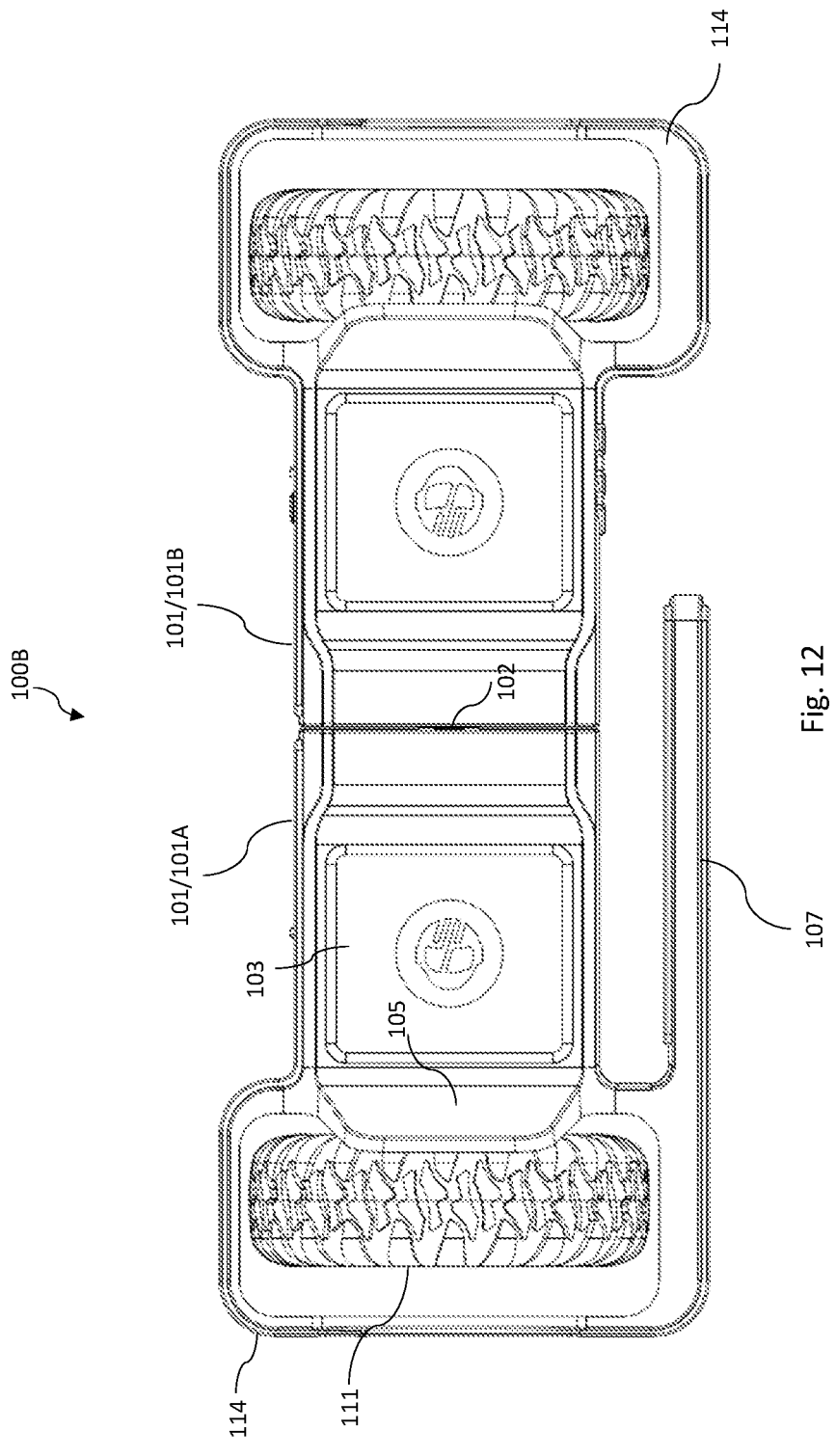

As illustrated in FIG. 9, the fender 105 of the hoverboard 100B is a solid piece of material (e.g., the same material as the main body 101), and does not have the through-hole in the fender 105 of the hoverboard 100A. Notably, the hoverboard 100B has a wheel stand 114 around each of the wheels 111. The wheel stands 114 may be formed of a same material as the main body, and are formed around the wheels 111. The wheel stands 114 are attached to the left side and the right side of the main body 101. For each wheel stand 114, a middle portion 114M of the wheel stand 114 has a rounded shape (e.g., an annular shape) with a rounded shaped hole 116. The middle portion 114M is wider than other portions of the wheel stand 114. The hole 116 in the wheel stand 114 allows the wheel stand 114 to also serve as a carrying handle.

Still referring to FIG. 9, a carrying handle 107 is connected to the wheel stand 114 around the right wheel 111A. In other words, the carrying handle 107 is attached to the front side of the main body 101 via the wheel stand 114. Unlike the carrying handle 107 of the hoverboard 100A (which includes two symmetric portions 107A and 107B), the carrying handle 107 of the hoverboard 100B is asymmetric and is attached to the right main body 101A of hoverboard 100B. Recesses 132 are formed at a front side of the carrying handle 107 and at a front side of the wheel stand 114, and a strap hook 131 (e.g., a metal bar) is formed in each of the recesses 132. A shoulder strap (not illustrated) may be attached to the strap hooks 131 for transporting the hoverboard 100B, when the hoverboard 100B is not in use.

Unlike the hoverboard 100A, the hoverboard 100B does not have the built-in stands 113. This is because the wheel stands 114 can function as the stand for the stereo system during the stereo mode.

Figure 13:
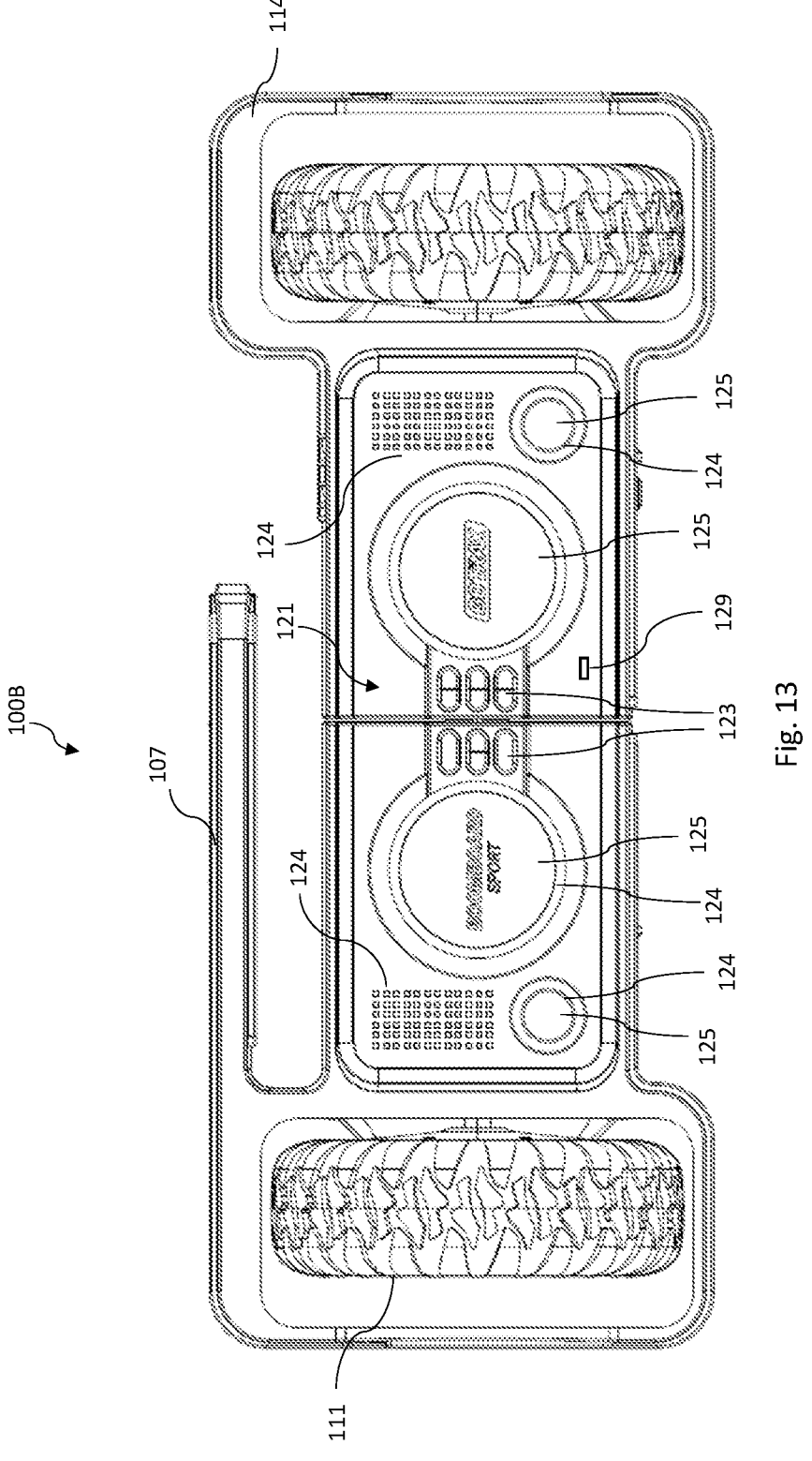
Figure 14:
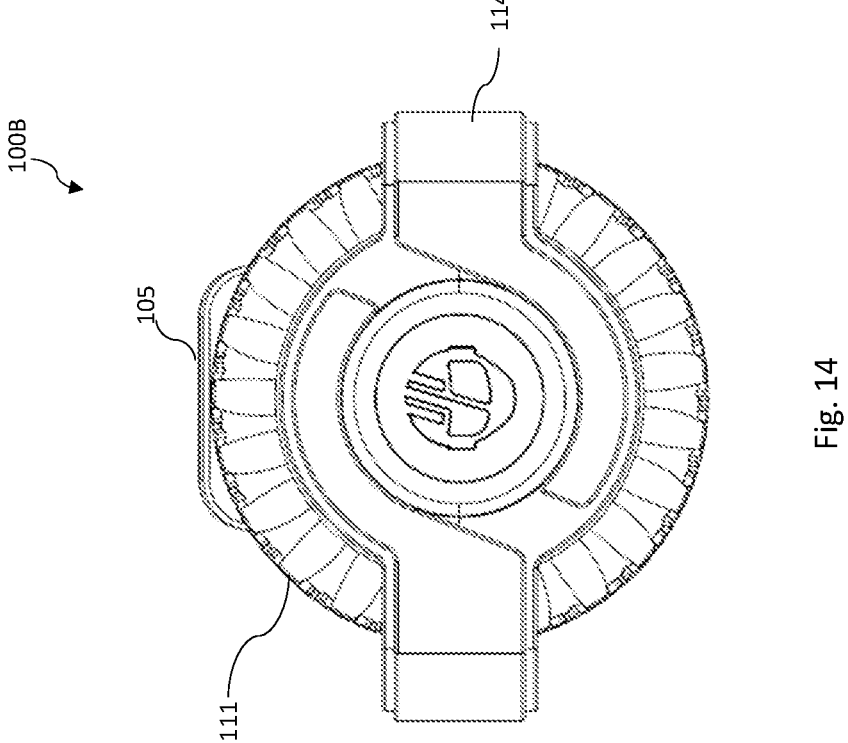

FIG. 13 shows the bottom surface of the hoverboard 100B. Four speakers 125 are shown for the hoverboard 100B in FIG. 13, with at least some of the LEDs 124 positioned at different locations from the LEDs 124 of the hoverboard 100A. The speakers 125 and the LEDs 124 shown in FIG. 13 are illustrative and non-limiting.

Figure 15:
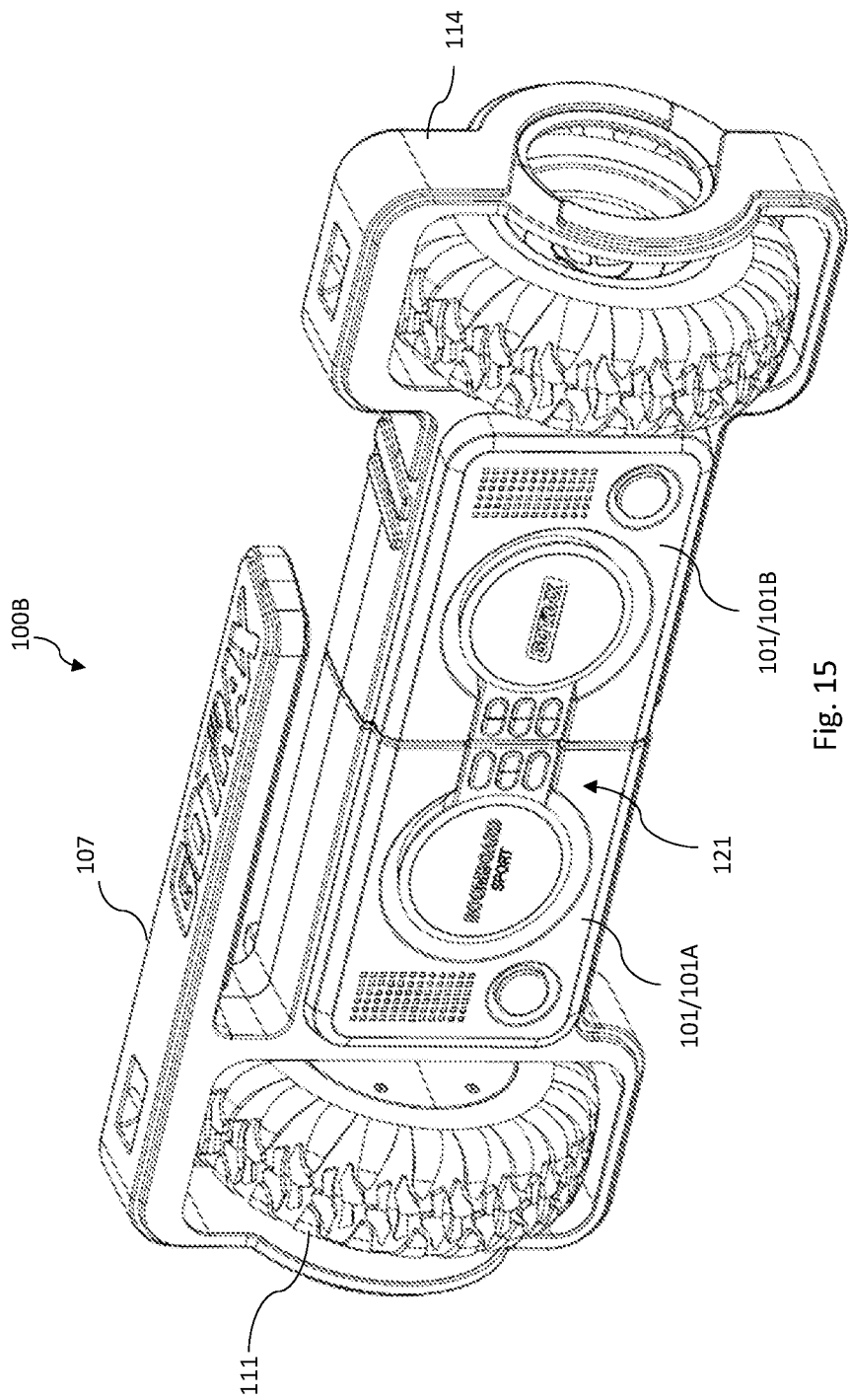

FIG. 15 shows the hoverboard 100B in the stereo mode. In the example of FIG. 15, the hoverboard 100B stands on the wheel stands 114, with the main body 101 disposed laterally between the wheel stands 114. The main body 101 and the wheels 111 do not contact the surface on which the hoverboard 100B is placed. In some embodiments, the hoverboard 100B, when in the stereo mode, may stand on one of the wheel stands 114, with the main body 101 disposed vertically between the wheel stands 114.

Figure 16:
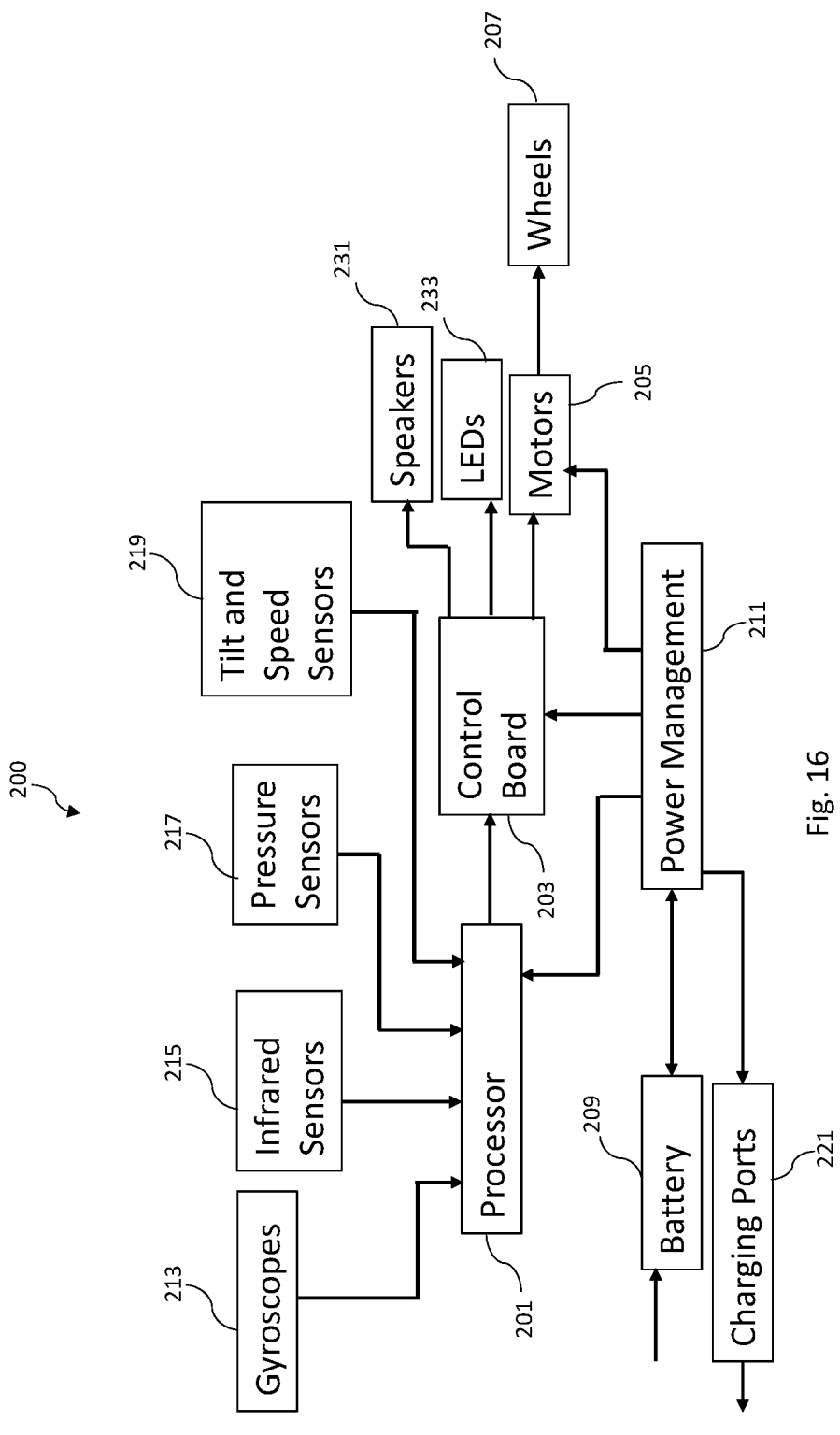
FIG. 16 illustrates a block diagram of a hoverboard, in an embodiment.

FIG. 16 illustrates a block diagram of a hoverboard 200, in an embodiment. The hoverboard 200 may correspond to the hoverboard (e.g., 100A or 100B) disclosed herein. Note that for simplicity, not all features of the hoverboard 200 are illustrated in FIG. 16. For ease of discussion, the hoverboards 100A and 100B may be collectively referred to as hoverboards 100, and hoverboard 100 may refer to the hoverboard 100A or the hoverboard 100B.

In FIG. 16, the hoverboard 200 includes a processor 201, a control board 203, motors 205, wheels 207, speakers 231, and LEDs 233. The wheels 207 correspond to the wheels 111 of the hoverboard 100. The motors 205 correspond to the motors that drive the wheels 111 of the hoverboard 100. The speakers 231 correspond to the speakers 125 of the hoverboard 100. The LEDs 233 correspond to the LEDs 124 and 109 of the hoverboard 100.

The hoverboard 200 in FIG. 16 further includes a plurality of sensors, such as gyroscopes 213, infrared sensors 215, pressure sensors 217, and tilt and speed sensors 219. The types of sensors illustrated in FIG. 16 are illustrative and non-limiting. Additionally, the hoverboard 200 includes a battery module 209, a power management module 211, and charging ports 221.

The processor 201 may be a micro-processor, a micro-controller, a central processing unit (CPU), or the like. The processor 201 receives sensor data from the plurality of sensors, processes the sensor data, and generates control signals to control operation of the hoverboard 200. The control board 203 includes circuits (e.g., driver circuits) for processing the control signals from the processor 201 and generating driving signals (e.g., voltage signals or current signals) for the motors 205, the speakers 231, and the LEDs 233. In some embodiments, the processor 201 is integrated into the control board 203. The motors 205 drives the wheels 207 to rotate in the direction and the rotational speed specified by the control signals from the processor 201.

The battery module 209 is a rechargeable battery, such as a lithium-ion recharge battery pack or other suitable rechargeable battery pack. The power management module 211 generates (e.g., derives) a plurality of supply voltages with different values from the battery module 209 to power different components of the hoverboard 200. The power management module 211 may include a plurality of switched-mode power supply (SMPS) systems, such as Buck converters, Buck-Boost converters, or the like. The charging ports 221 (e.g., USB ports) are used for charging external devices connected to the charging ports 221.

Figure 17:
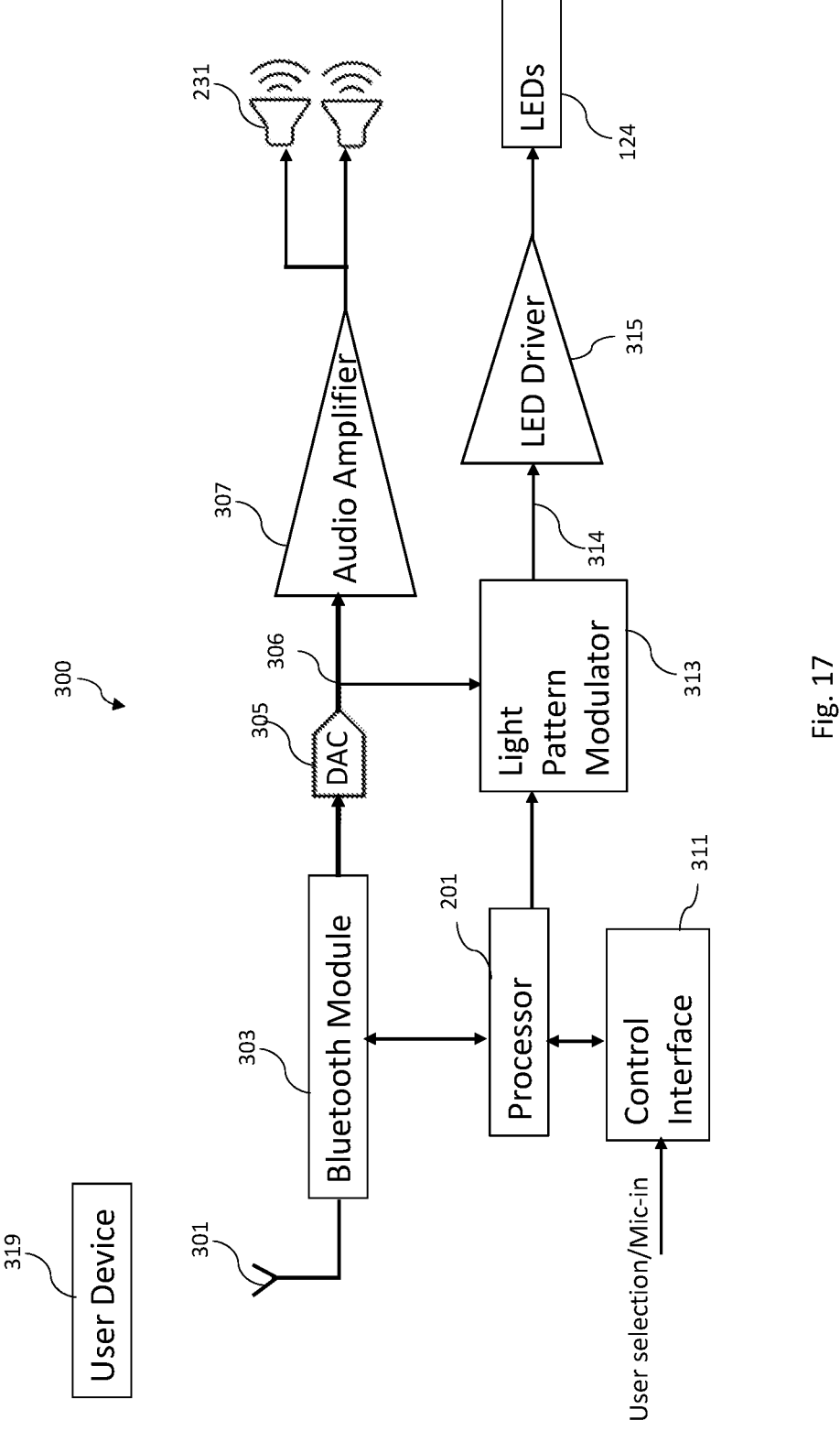
FIG. 17 illustrates a block diagram of a stereo system, in an embodiment.

FIG. 17 illustrates a block diagram of a stereo system 300, in an embodiment. The stereo system 300 corresponds to portions of the hoverboard 100 in stereo mode that function as a stereo system. In other words, the stereo system 300 is part of the hoverboard 200. Some components of the stereo system 300 may be integrated into the control board 203 in FIG. 16. For simplicity, not all features of the stereo system 300 are illustrated.

As illustrated in FIG. 17, the stereo system 300 includes an antenna 301, a Bluetooth module 303, a digital-to-analog converter (DAC) module 305, an audio amplifier module 307, the speakers 231, the processor 201, a control interface 311, a light pattern modulator 313, an LED driver 315, and the LEDs 124. The Bluetooth module 303 includes circuits for wireless communication between the hoverboard 200 and a user device 319. The user device 319 may be, e.g., a smart phone running an application that communicates with the hoverboard 200. Once the Bluetooth module 303 is paired with the user device 319, the Bluetooth module 303 can request the user device 319 to stream digital media (e.g., streaming music) to the Bluetooth module 303. Note that the Bluetooth module 303 is a non-limiting example, other wireless communication modules (e.g., based on other wireless communication protocols) may also be used, as skilled artisans readily appreciate.

The digital media received by the Bluetooth module 303 is converted into analog signal by the DAC module 305, and the output signal 306 of the DAC module 305 is amplified by the audio amplifier module 307. The output of the audio amplifier module 307 is used to drive the speakers 231.

In FIG. 17, the processor 201 receives the user selection made through the control interface 311, and controls the playback of the digital media based on the user selection. The control interface 311 may correspond to the control panel 121 of the hoverboard 100, and the user selection may correspond to the button of the control panel 121 being pressed by the user. The user may also give voice command through the microphone 129 of the hoverboard 100, in which case the voice command is sent to the user device 319 to interact with the application or the voice assistant (e.g., Siri, Alexa, or Google Assistant) running on the user device 319.

Still referring to FIG. 17, the output signal 306 of the DAC module 305 is sent to the light pattern modulator 313. The processor 201 may send a modulation scheme selection signal to the light pattern modulator 313 to select how the light pattern is modulated by the output signal 306 of the DAC module 305. The light pattern modulator 313 modulates (e.g., modifies) its output signal 314 based on certain characteristics of the output signal 306 of the DAC module 305, such as the beat, the pitch, the volume, the like, or combinations thereof, of the output signal 306. The output signal 314 is then sent to the LED driver 315, which generates a driving signal based on the output signal 314 to drive the LEDs 124. In an embodiment, the output signal 314 changes with (e.g., is modified by) the beat of the music being played, and therefore, the light pattern of the LEDs 124 changes with the beat of the music being played. In other words, different music will result in different output signal 314, thus different light show performed by the LEDs 124. In some embodiments, the Bluetooth module 303, the DAC module 305, the audio amplifier module 307, the light pattern modulator 313, and the LED driver 315 are integrated in the control board 203 of FIG. 16.

Figure 18:
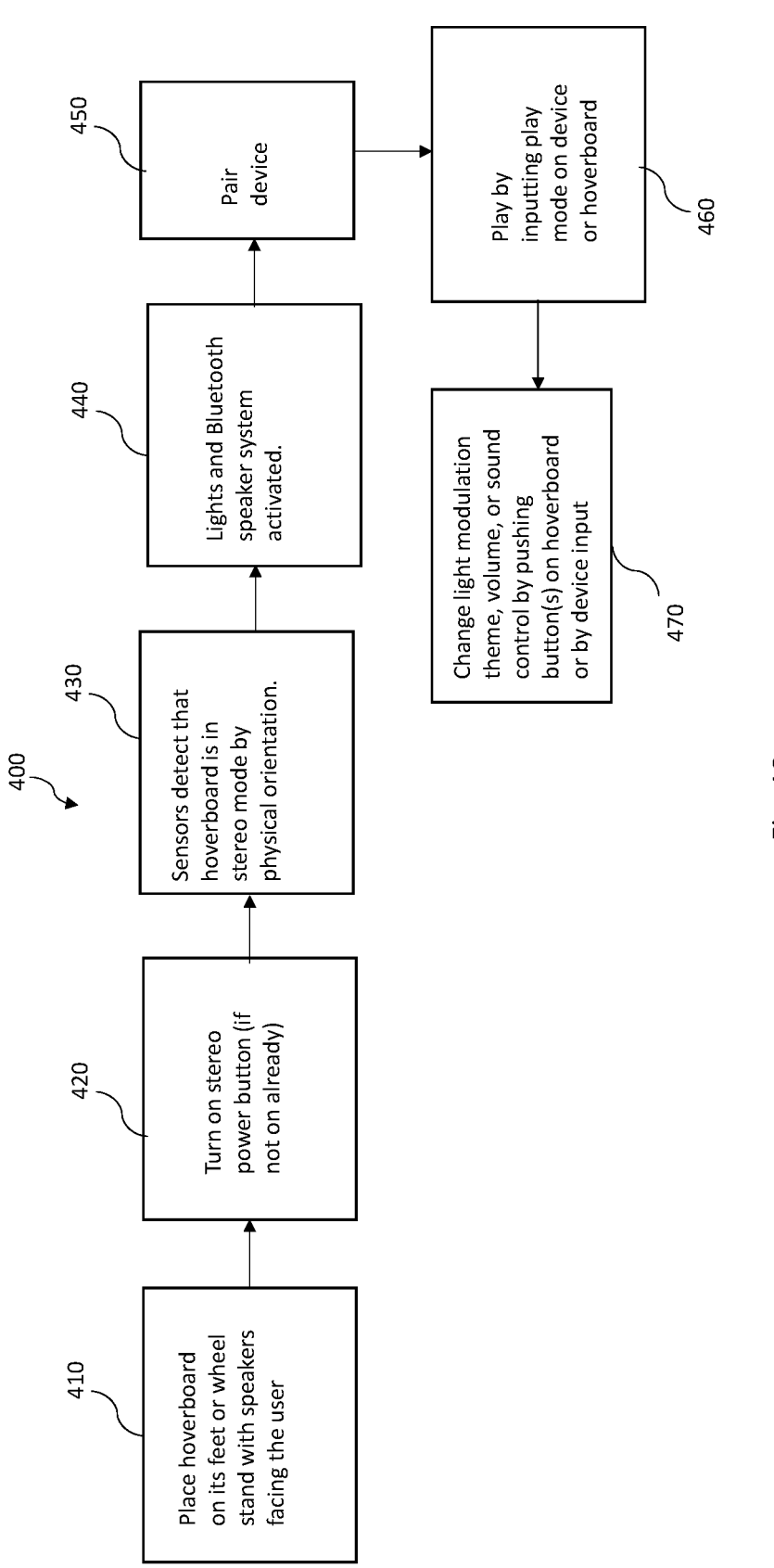
FIG. 18 illustrates a flow chart of a method of operating a hoverboard, in an embodiment.

FIG. 18 illustrates a flow chart of a method 400 of operating a hoverboard, in an embodiment. It should be understood that the example method shown in FIG. 18 is merely an example of many possible example methods. One of ordinary skill in the art would recognize many variations, alternatives, and modifications. For example, various steps as illustrated in FIG. 18 may be added, removed, replaced, rearranged, or repeated.

Referring to FIG. 18, in block 410, the hoverboard is placed on its feet or wheel stand with speakers facing the user. In block 420, the power button for the speakers is turned on. In block 430, sensors on the hoverboard detect that the hoverboard is in the stereo mode by detecting its physical orientation. For example, the gyroscopes, the tilt and speed sensors, and/or other sensors may be used to detect the physical orientation of the hoverboard, which physical orientation is used to determine that the hoverboard is in the stereo mode. For example, when the hoverboard 100A is in the stereo mode, the bottom surface 101C of the main body is facing away from the ground (see, e.g., FIGS. 7 and 8), which is an indication that the hoverboard is entering the stereo mode. Similarly, when the hoverboard 100B is in the stereo mode, the hoverboard 100B stands on one wheel stand 114 or on two wheel stands 114 (see FIG. 15), and the bottom surface of the main body 101 does not face the ground, and is perpendicular to the ground. For ease of discussion herein, the bottom surface of the main body 101 of the hoverboard 100B is also said to be facing away from the ground when in stereo mode. In some embodiments, the user can manually flip a switch or press a button on the hoverboard to set the hoverboard in the stereo mode. In block 440, the LEDs and the speakers of the stereo system are activated. In block 450, the hoverboard searches for the user device and pairs with the user device (e.g., a Bluetooth enabled user device). In block 460, the user starts playing music by pressing the Play button at the bottom surface of the hoverboard, or by entering command on the user device. In block 470, the user adjusts setting for the playback of the music, such as changing the modulation scheme for the light pattern of the LEDs, the volume, or other sound control by pushing the buttons at the bottom surface of the hoverboard or by entering command on the user device.

In some embodiments, when the hoverboard is in the riding mode (e.g., the bottom surface of the main body faces the ground) and moving at a speed larger than zero, the LEDs 124 at the bottom surface of the hoverboard are turned off, and the LEDs 124 are said to be in the OFF state. When the LEDs 124 are in the OFF state, the LED driver 315 is turned off, and no electrical current (e.g., the driving current) is sent to the LEDs 124. When the hoverboard is in the stereo mode, the LEDs 124 are turned on to display the light show, and the LEDs 124 are said to be in the ON state. When the LEDs 124 are in the ON state, the LED driver 315 is turned on (e.g., fully turned on) to generate an electrical current $I_{ON}$, which is sent to the LEDs 124 to drive the LEDs 124.

In some embodiments, in order to save battery power and to allow for a quick turn-on process for the LEDs 124 when the hoverboard enters the stereo mode, a low-power (LP) state is introduced for the LEDs 124. The LEDs 124 enter the LP state when the hoverboard is in the riding mode (e.g., the bottom surface of the main body faces the ground) and is not moving (e.g., having a zero speed). For example, the LEDs 124 may enter the LP state after the rider gets off the hoverboard and before the hoverboard is flipped to enter the stereo mode (e.g., the bottom surface of the main body faces away from the ground). As another example, the LEDs 124 may enter the LP state after the user finishes listing to the music in the stereo mode and flips the hoverboard to enter riding mode (e.g., the bottom surface of the main body faces the ground).

In the LP state, the LED driver 315 is partially turned on to generate an electrical current $I_{LP}$, which is sent to the LEDs 124 to drive the LEDs 124. The electrical current $I_{LP}$ is much smaller than the electrical current $I_{ON}$, such as being 10%, 5%, or less, of the electrical current $I_{ON}$. Due to the low driving current in the low-power mode, the LEDs 124 emit no light or very little light, thus consuming very little battery power.

In some embodiments, due to the hardware characteristics of the LED driver 315 and the LEDs 124, it may be difficult to turn the LED driver 315 (or the LEDs 124) from an OFF state to a fully ON state instantly, and the driving current for the LEDs 124 may need to ramp up gradually within a period of time. In other words, cold start of the LEDs 124 from an OFF state to a full ON state may take a while. By putting the LEDs 124 in the LP state, the LEDs 124 are in a stand-by mode ready to be turned on, and a warm start of the LEDs 124 may be much faster than a cold start of the LEDs 124. The shorter turn-on time of the LEDs 124 reduces the lag between the time the user flips the hoverboard to enter the stereo mode and the time the LEDs 124 light up, thereby improving user experience. The LEDs 124, while in the LP state, consume very little energy. Therefore, the LP state achieves better user experience with little impact on power consumption.

Figure 19:
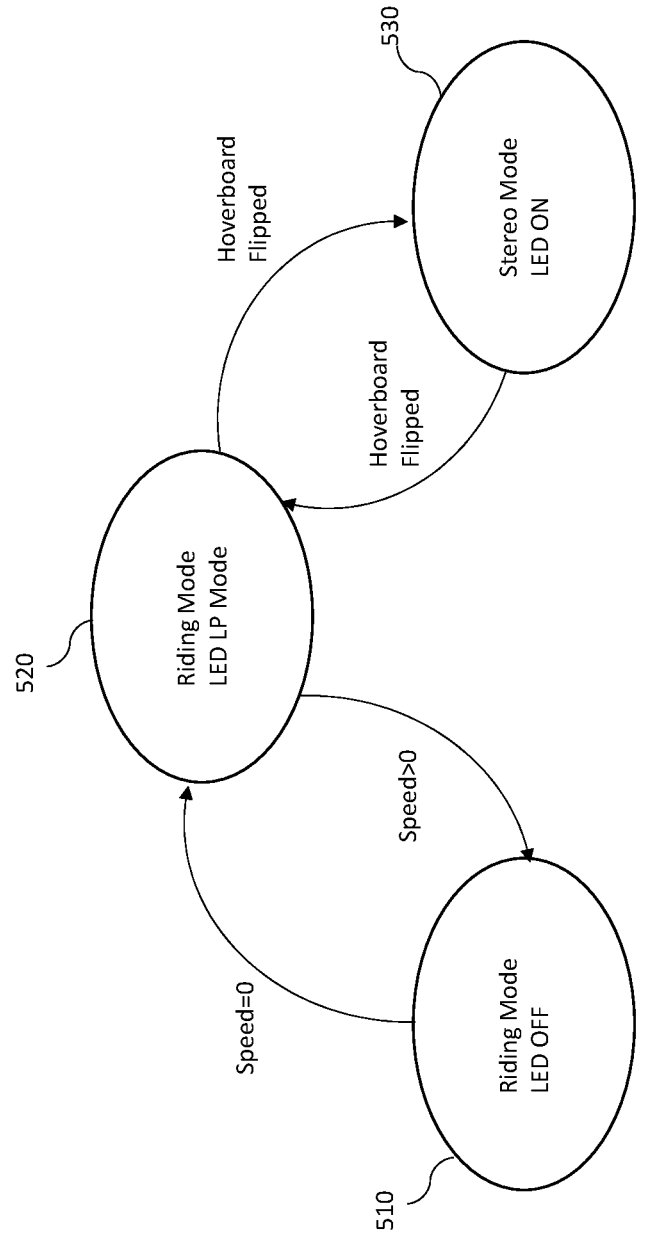
FIG. 19 illustrates a state diagram of a hoverboard, in an embodiment.

FIG. 19 illustrates a state diagram of the hoverboard disclosed herein, in an embodiment. The state diagram summarizes the discussion above regarding the transition between the riding mode and the stereo mode, and the different state (e.g., ON, OFF, LP) for the LEDs 124. FIG. 19 shows the transitions between states 510, 520 and 530. The state 510 corresponds to the state where the hoverboard is in the riding mode (e.g., bottom surface of the main body 101 faces the ground) and the LEDs 124 are in the OFF state. The state 520 corresponds to the state when the hoverboard is in the riding mode and the LEDs 124 are in the low-power (LP) state. The state 530 corresponds to the state when the hoverboard is in the stereo mode (e.g., bottom surface of the main body 101 faces away from the ground) and the LEDs 124 are in the ON state.

The transition from the state 510 to the state 520 corresponds to the scenario where the user gets off the hoverboard, and the hoverboard stops (e.g., speed of hoverboard=0). The hoverboard enters the state 520 in anticipation of entering the stereo mode. The transition from the state 520 to the state 510 corresponds to the scenario when the user gets back on the hoverboard and starts moving the hoverboard (e.g., the speed of hoverboard is larger than zero).

The transition from the state 520 to the state 530 corresponds to the scenario where the user flips the hoverboard (such that the bottom surface of the main body 101 faces away from the ground) to enter the stereo mode. The transition from the state 530 to the state 520 corresponds to the scenario where the user flips the hoverboard (such that the bottom surface of the main body faces the ground) to leave the stereo mode and enter the riding mode, but before the hoverboard starts moving.

Disclosed embodiments achieve advantages. The hoverboards disclosed herein are designed to play premium sound quality, and the LED light show is designed to move to the beat of the music for a more engaging and entertaining experience. Dedicated control buttons allow seamless and easy use of the stereo system. The disclosed Hoverboards have feet or wheel stands that allow the hoverboards to be safely stored on a table or a shelf off of its wheels. The state transition shown in FIG. 19, with introduction of the low-power state for the LEDs, achieves fast turn-on of the LEDs with little impact on battery power consumption.

In an embodiment, a hoverboard includes: a main body comprising a left main body and a right main body, wherein the left main body and the right main body are independently tiltable around a center axis of the main body; a left wheel and a right wheel attached to the left main body and the right main body, respectively; a first fender and a second fender attached to a top surface of the main body proximate to the left wheel and the right wheel, respectively; a carrying handle attached to a front side of the main body; at least two speakers at a bottom surface of the main body; a wireless communication circuit configured to be paired with a user device for streaming digital media via the user device; and a stereo control panel at the bottom surface of the main body, wherein the stereo control panel comprises a suite of buttons for controlling playback of the digital media. In an embodiment, the hoverboard further includes: a first motor mechanically coupled to the left wheel; a second motor mechanically coupled to the right wheel; and a rechargeable battery pack. In an embodiment, the hoverboard further includes: first light-emitting diodes (LEDs) at the bottom surface of the hoverboard; and a light pattern modulator circuit, wherein during the playback of the digital media, the light pattern modulator circuit is configured to modulate a light pattern of the first LEDs with the digital media. In an embodiment, the digital media is music, and the light pattern modulator circuit is configured to modulate the light pattern of the first LEDs such that the light pattern of the first LEDs changes with a beat of the music. In an embodiment, the hoverboard further includes second LEDs at the front side of the main body and a backside of the main body, wherein during a riding mode of the hoverboard, the second LEDs are configured to display one or more pre-determined light patterns. In an embodiment, the hoverboard further includes a first built-in stand and a second built-in stand that are attached to a backside of the left main body and a backside of the right main body, respectively. In an embodiment, when the hoverboard is placed on a flat surface with the bottom surface of the main body facing away from the flat surface, the first fender, the second fender, the first built-in stand and the second built-in stand support the main body and prop the left wheel and the right wheel off the flat surface. In an embodiment, the hoverboard further includes: a first wheel-stand attached to the left main body, wherein the first wheel-stand surrounds the left wheel, wherein a middle portion of the first wheel-stand is wider than other portions of the first wheel-stand, wherein the middle portion of the first wheel-stand has a first through-hole; and a second wheel-stand attached to the right main body and around the right wheel, wherein the second wheel-stand surrounds the right wheel, wherein a middle portion of the second wheel-stand is wider than other portions of the second wheel-stand, wherein the middle portion of the second wheel-stand has a second through-hole. In an embodiment, when the hoverboard is placed on a flat surface, the hoverboard is capable of standing on at least one of the first wheel-stand and the second wheel-stand, with the left wheel and the right wheel being lifted off the flat surface. In an embodiment, the carrying handle is physically connected to a first one of the first wheel-stand and the second wheel-stand, and is not physically connected to a second one of the first wheel-stand and the second wheel-stand.

In an embodiment, a hoverboard includes: a main body comprising a left main body and a right main body, wherein the left main body and the right main body are spaced apart, and are configured to tilt around a center axis of the main body independently; a left wheel and a right wheel attached to the left main body and the right main body, respectively; a first motor mechanically coupled to the left wheel; a second motor mechanically coupled to the right wheel; and a rechargeable battery pack; at least two speakers at a bottom surface of the main body for playback of stereo sound, wherein the bottom surface of the main body faces the ground when the hoverboard is in a riding mode of the hoverboard; a wireless communication module capable of being paired with a user device for streaming music via the user device; and a stereo control panel at the bottom surface of the main body, wherein the stereo control panel comprises a suite of buttons for controlling playback of the music in a stereo mode of the hoverboard. In an embodiment, the hoverboard further includes: a first fender and a second fender attached to a top surface of the main body proximate to the left wheel and the right wheel, respectively; and a first built-in stand and a second built-in stand that are attached to a backside of the left main body and a backside of the right main body, respectively, wherein when the hoverboard is placed on a flat surface with the bottom surface of the main body facing away from the ground, the first built-in stand, the second built-in stand, the first fender and the second fender are in contact with the flat surface while the main body, the left wheel, and the right wheel are not in contact with the flat surface. In an embodiment, the hoverboard further includes a carrying handle attached to a front side of the main body. In an embodiment, the hoverboard further includes: a first plurality of light-emitting diodes (LEDs) at the bottom surface of the main body; and a light pattern modulator circuit, wherein during the playback of the music in the stereo mode, the light pattern modulator circuit is configured to modulate a light pattern of the first plurality of LEDs with the music. In an embodiment, the hoverboard further includes: a second plurality of LEDs at a front side of the main body and a backside of the main body, wherein in the riding mode, the second plurality of LEDs are configured to display one or more fixed light patterns. In an embodiment, the hoverboard further includes: a first speed sensor and a second speed sensor configured to measure a rotational speed of the left wheel and a rotational speed of the right wheel, respectively; a mechanism for determining whether the bottom surface of the main body is facing the ground; and a controller, wherein the controller is configured to turn the first plurality of LEDs on when the hoverboard is in the stereo mode, and is configured to turn the first plurality of LEDs off when the hoverboard is in a riding mode of the hoverboard and is moving, wherein the controller is configured to set the first plurality of LEDs in a lower power mode when the hoverboard is in the riding mode and is stopped.

In an embodiment, a hoverboard includes: a main body comprising a left main body and a right main body, wherein the left main body and the right main body are attached to a center axis of the hoverboard, and are tiltable around the center axis independently; a left wheel and a right wheel attached to the left main body and the right main body, respectively; a first motor and a second motor configured to drive the left wheel and the right wheel, respectively; a rechargeable battery pack; a first fender and a second fender attached to a first top surface of the left main body and a second top surface of the right main body, respectively, wherein the first fender and the second fender are proximate to the left wheel and the right wheel, respectively; a wireless communication module configured to be paired with a user device for streaming music via the user device; a plurality of speakers at a bottom surface of the main body; and a stereo control panel at the bottom surface of the main body, wherein the stereo control panel comprises a suite of buttons for controlling playback of the music and comprises a first plurality of light-emitting diodes (LEDs), wherein a light pattern of the first plurality of LEDs is configured to change with a beat of the music in a stereo mode of the hoverboard. In an embodiment, the hoverboard further includes: a light pattern modulator circuit configured to modulate the light pattern of the first plurality of LEDs with the music in the stereo mode; and a second plurality of LEDs at a front side and a backside of the main body, wherein the second plurality of LEDs are configured to display one or more fixed light patterns in a riding mode of the hoverboard. In an embodiment, the hoverboard further includes: speed sensors for sensing rotational speeds of the left wheel and the right wheel; a sensing mechanism for determining whether or not the bottom surface of the main body is facing the ground; and a processor coupled to the speed sensors and the sensing mechanism, wherein the processor is configured to: turn the first plurality of LEDs off when the bottom surface of the main body is facing the ground and the hoverboard is moving; turn the first plurality of LEDs on when the bottom surface of the main body is facing away from the ground and the hoverboard is stopped; and set the first plurality of LEDs in a lower power mode when the bottom surface of the main body is facing the ground and the hoverboard is stopped. In an embodiment, the hoverboard further includes: a first built-in stand and a second built-in stand attached to a backside of the left main body and a backside of the right main body, respectively, wherein when the hoverboard is placed on a flat surface with the bottom surface of the main body facing away from the ground, the first built-in stand, the second built-in stand, the first fender and the second fender are in contact with the flat surface while the main body, the left wheel, and the right wheel are not in contact with the flat surface.

While this invention has been described with reference to illustrative examples, this description is not intended to be construed in a limiting sense. Various modifications and combinations of the illustrative examples, as well as other examples of the invention, will be apparent to persons skilled in the art upon reference to the description. It is therefore intended that the appended claims encompass any such modifications or examples.

What is claimed is:

1. A hoverboard comprising:

a main body comprising a left main body and a right main body, wherein the left main body and the right main body are independently tiltable around a center axis of the main body;

a left wheel and a right wheel attached to the left main body and the right main body, respectively;

a first fender and a second fender attached to a top surface of the main body proximate to the left wheel and the right wheel, respectively;

a carrying handle attached to a front side of the main body;

at least two speakers at a bottom surface of the main body;

a wireless communication circuit configured to be paired with a user device for streaming digital media via the user device;

a stereo control panel at the bottom surface of the main body, wherein the stereo control panel comprises a suite of buttons for controlling playback of the digital media;

first light-emitting diodes (LEDs) at the bottom surface of the hoverboard; and a light pattern modulator circuit, wherein during the playback of the digital media, the light pattern modulator circuit is configured to modulate a light pattern of the first LEDs with the digital media.

2. The hoverboard of claim 1, further comprising:

a first motor mechanically coupled to the left wheel;

a second motor mechanically coupled to the right wheel; and a rechargeable battery pack.

3. The hoverboard of claim 1, wherein the digital media is music, and the light pattern modulator circuit is configured to modulate the light pattern of the first LEDs such that the light pattern of the first LEDs changes with a beat of the music.

4. The hoverboard of claim 3, further comprising second LEDs at the front side of the main body and a backside of the main body, wherein during a riding mode of the hoverboard, the second LEDs are configured to display one or more pre-determined light patterns.

5. The hoverboard of claim 1, further comprising a first built-in stand and a second built-in stand that are attached to a backside of the left main body and a backside of the right main body, respectively.

6. The hoverboard of claim 5, wherein when the hoverboard is placed on a flat surface with the bottom surface of the main body facing away from the flat surface, the first fender, the second fender, the first built-in stand and the second built-in stand support the main body and prop the left wheel and the right wheel off the flat surface.

7. The hoverboard of claim 1, further comprising:

a first wheel-stand attached to the left main body, wherein the first wheel-stand surrounds the left wheel, wherein a middle portion of the first wheel-stand is wider than other portions of the first wheel-stand, wherein the middle portion of the first wheel-stand has a first through-hole; and a second wheel-stand attached to the right main body and around the right wheel, wherein the second wheel-stand surrounds the right wheel, wherein a middle portion of the second wheel-stand is wider than other portions of the second wheel-stand, wherein the middle portion of the second wheel-stand has a second through-hole.

8. The hoverboard of claim 7, wherein when the hoverboard is placed on a flat surface, the hoverboard is capable of standing on at least one of the first wheel-stand and the second wheel-stand, with the left wheel and the right wheel being lifted off the flat surface.

9. The hoverboard of claim 7, wherein the carrying handle is physically connected to a first one of the first wheel-stand and the second wheel-stand, and is not physically connected to a second one of the first wheel-stand and the second wheel-stand.

10. The hoverboard of claim 1, further comprising:

a sensors configured to measure rotational speeds of the left and right wheels;

a mechanism for detecting the physical orientation of the hoverboard and determining that the hoverboard is in a riding mode when the detected physical orientation indicates that the bottom surface of the main body is facing the ground and determining that the hoverboard is in a stereo mode when detected physical orientation indicates that the bottom surface of the main body is facing away from the ground; and a controller configured to turn the first plurality of LEDs on when the hoverboard is in the stereo mode, and is configured to turn the first plurality of LEDs off when the hoverboard is in a riding mode of the hoverboard and is moving.

11. The hoverboard of claim 10, wherein the controller if further configured to set the first plurality of LEDs in a lower power mode when the hoverboard is in the riding mode and the rotational speeds of the left wheel and right wheel indicate that the hoverboard is stopped.

12. A hoverboard comprising:

a main body comprising a left main body and a right main body, wherein the left main body and the right main body are spaced apart, and are configured to tilt around a center axis of the main body independently;

a left wheel and a right wheel attached to the left main body and the right main body, respectively;

a first motor mechanically coupled to the left wheel;

a second motor mechanically coupled to the right wheel;

a rechargeable battery pack;

at least two speakers at a bottom surface of the main body for playback of stereo sound, wherein the bottom surface of the main body faces the ground when the hoverboard is in a riding mode of the hoverboard;

a wireless communication module capable of being paired with a user device for streaming music via the user device;

a stereo control panel at the bottom surface of the main body, wherein the stereo control panel comprises a suite of buttons for controlling playback of the music in a stereo mode of the hoverboard;

a first fender and a second fender attached to a top surface of the main body proximate to the left wheel and the right wheel, respectively; and a first built-in stand and a second built-in stand that are attached to a backside of the left main body and a backside of the right main body, respectively, wherein when the hoverboard is placed on a flat surface with the bottom surface of the main body facing away from the ground, the first built-in stand, the second built-in stand, the first fender and the second fender are in contact with the flat surface while the main body, the left wheel, and the right wheel are not in contact with the flat surface.

13. The hoverboard of claim 12, further comprising a carrying handle attached to a front side of the main body.

14. The hoverboard of claim 12, wherein the hoverboard further comprising:

a first plurality of light-emitting diodes (LEDs) at the bottom surface of the main body; and a light pattern modulator circuit, wherein during the playback of the music in the stereo mode, the light pattern modulator circuit is configured to modulate a light pattern of the first plurality of LEDs with the music.

15. The hoverboard of claim 14, wherein the hoverboard further comprising:

a second plurality of LEDs at a front side of the main body and a backside of the main body, wherein in the riding mode, the second plurality of LEDs are configured to display one or more fixed light patterns.

16. The hoverboard of claim 14, further comprising:

a first speed sensor and a second speed sensor configured to measure a rotational speed of the left wheel and a rotational speed of the right wheel, respectively;

a mechanism for determining whether the bottom surface of the main body is facing the ground; and a controller, wherein the controller is configured to turn the first plurality of LEDs on when the hoverboard is in the stereo mode, and is configured to turn the first plurality of LEDs off when the hoverboard is in a riding mode of the hoverboard and is moving, wherein the controller is configured to set the first plurality of LEDs in a lower power mode when the hoverboard is in the riding mode and is stopped.

17. A hoverboard comprising:

a main body comprising a left main body and a right main body, wherein the left main body and the right main body are attached to a center axis of the hoverboard, and are tiltable around the center axis independently;

a left wheel and a right wheel attached to the left main body and the right main body, respectively;

a first motor and a second motor configured to drive the left wheel and the right wheel, respectively;

a rechargeable battery pack;

a first fender and a second fender attached to a first top surface of the left main body and a second top surface of the right main body, respectively, wherein the first fender and the second fender are proximate to the left wheel and the right wheel, respectively;

a wireless communication module configured to be paired with a user device for streaming music via the user device;

a plurality of speakers at a bottom surface of the main body; and a stereo control panel at the bottom surface of the main body, wherein the stereo control panel comprises a suite of buttons for controlling playback of the music and comprises a first plurality of light-emitting diodes (LEDs), wherein a light pattern of the first plurality of LEDs is configured to change with a beat of the music in a stereo mode of the hoverboard.

18. The hoverboard of claim 17, further comprising:

a light pattern modulator circuit configured to modulate the light pattern of the first plurality of LEDs with the music in the stereo mode; and a second plurality of LEDs at a front side and a backside of the main body, wherein the second plurality of LEDs are configured to display one or more fixed light patterns in a riding mode of the hoverboard.

19. The hoverboard of claim 17, further comprising:

speed sensors for sensing rotational speeds of the left wheel and the right wheel;

a sensing mechanism for determining whether or not the bottom surface of the main body is facing the ground; and a processor coupled to the speed sensors and the sensing mechanism, wherein the processor is configured to:

turn the first plurality of LEDs off when the bottom surface of the main body is facing the ground and the hoverboard is moving;

turn the first plurality of LEDs on when the bottom surface of the main body is facing away from the ground and the hoverboard is stopped; and set the first plurality of LEDs in a lower power mode when the bottom surface of the main body is facing the ground and the hoverboard is stopped.

20. The hoverboard of claim 17, further comprising:

a first built-in stand and a second built-in stand attached to a backside of the left main body and a backside of the right main body, respectively, wherein when the hoverboard is placed on a flat surface with the bottom surface of the main body facing away from the ground, the first built-in stand, the second built-in stand, the first fender and the second fender are in contact with the flat surface while the main body, the left wheel, and the right wheel are not in contact with the flat surface.

* * * * *